United States Patent
Hori et al.

(10) Patent No.: US 7,716,746 B2
(45) Date of Patent: May 11, 2010

(54) DATA STORING DEVICE FOR CLASSIFIED DATA

(75) Inventors: Yoshihiro Hori, Gifu (JP); Ryoji Ohno, Osaka (JP); Takeo Ohishi, Yokohama (JP); Akihiro Tozaki, Tokorozawa (JP); Kenichiro Tada, Tokorozawa (JP); Tatsuya Hirai, Kawasaki (JP); Masafumi Tsuru, Tokyo (JP); Takayuki Hasebe, Kawasaki (JP)

(73) Assignees: Sanyo Electric Co., Ltd., Osaka (JP); Sharp Kabushiki Kaisha, Osaka (JP); Victor Company of Japan, Kanagawa (JP); Pioneer Corporation, Tokyo (JP); Hitachi, Ltd., Tokyo (JP); Fujitsu Limited, Kanagawa (JP)

( * ) Notice: Subject to any disclaimer, the term of this patent is extended or adjusted under 35 U.S.C. 154(b) by 824 days.

(21) Appl. No.: 10/506,505

(22) PCT Filed: Mar. 4, 2003

(86) PCT No.: PCT/JP03/02525

§ 371 (c)(1),
(2), (4) Date: Sep. 3, 2004

(87) PCT Pub. No.: WO03/075163

PCT Pub. Date: Sep. 12, 2003

(65) Prior Publication Data

US 2005/0160044 A1     Jul. 21, 2005

(30) Foreign Application Priority Data

Mar. 5, 2002   (JP) ............................... 2002-059179

(51) Int. Cl.
G06F 11/30 (2006.01)
G06F 12/14 (2006.01)
G06F 21/00 (2006.01)

(52) U.S. Cl. ............................. 726/30; 713/193; 705/59
(58) Field of Classification Search ................... 726/26, 726/30; 705/59; 713/193
See application file for complete search history.

(56) References Cited

U.S. PATENT DOCUMENTS 4,249,172 A     2/1981   Watkins et al.

(Continued)

FOREIGN PATENT DOCUMENTS

EP     1 237 324 A1     9/2002

(Continued)

OTHER PUBLICATIONS

Japanese Office Action with English translation issued in corresponding Japanese Patent Application No. 2002-059179 mailed Mar. 6, 2007.

*Primary Examiner*—Christian LaForgia
(74) *Attorney, Agent, or Firm*—McDermott Will & Emery LLP

(57) ABSTRACT

A controller in a hard disk serving as a data storage device stores a license including a content key for decrypting encrypted content data E and others in a secure data storage portion. The license is managed in the secure data storage portion in accordance with a LBA, and the LBA for storing the license, which is being processed for transmission, is stored as a log in a log memory of the secure data storage portion. When a failure occurs during the transmission processing, the license, which was being processed for transmission, is specified based on the LBA stored in the log memory.

16 Claims, 19 Drawing Sheets

U.S. PATENT DOCUMENTS

| | | | |
|---|---|---|---|
| 5,828,821 | A | 10/1998 | Hoshina et al. |
| 5,919,257 | A | 7/1999 | Trostle |
| 5,953,685 | A | 9/1999 | Bogin et al. |
| 5,956,735 | A | 9/1999 | Clark et al. |
| 6,023,710 | A | 2/2000 | Steiner et al. |
| 6,034,832 | A | 3/2000 | Ichimura et al. |
| 6,078,338 | A | 6/2000 | Horan et al. |
| 6,477,530 | B1* | 11/2002 | Omata et al. ............ 707/9 |
| 6,732,124 | B1 | 5/2004 | Koseki et al. |
| 6,789,203 | B1 | 9/2004 | Belissent |
| 6,898,708 | B2* | 5/2005 | Hori et al. ............ 713/171 |
| 6,952,737 | B1 | 10/2005 | Coates et al. |
| 6,999,948 | B1* | 2/2006 | Hatanaka et al. ........... 705/65 |
| 7,010,809 | B2* | 3/2006 | Hori et al. ............ 726/26 |
| 7,134,026 | B2* | 11/2006 | Horiuchi et al. .......... 713/193 |
| 7,181,629 | B1* | 2/2007 | Hatanaka et al. .......... 713/194 |
| 7,185,013 | B2 | 2/2007 | Burnett |
| 7,219,227 | B2* | 5/2007 | Hori et al. ............ 713/158 |
| 7,222,153 | B2 | 5/2007 | Ando et al. |
| 7,243,242 | B2* | 7/2007 | Moriai ............ 713/300 |
| 7,305,558 | B1 | 12/2007 | Miyazaki et al. |
| 7,340,055 | B2 | 3/2008 | Hori et al. |
| 2002/0034302 | A1* | 3/2002 | Moriai et al. ............ 380/270 |
| 2002/0131594 | A1* | 9/2002 | Hori et al. ............ 380/201 |
| 2002/0136405 | A1* | 9/2002 | Hori ............ 380/203 |
| 2002/0138442 | A1* | 9/2002 | Hori et al. ............ 705/59 |
| 2002/0138733 | A1 | 9/2002 | Ishibashi et al. |
| 2002/0176580 | A1* | 11/2002 | Horiuchi et al. ............ 380/270 |
| 2002/0183985 | A1* | 12/2002 | Hori et al. ............ 703/1 |
| 2002/0184154 | A1 | 12/2002 | Hori et al. |
| 2002/0184492 | A1* | 12/2002 | Hori et al. ............ 713/158 |
| 2002/0191764 | A1* | 12/2002 | Hori et al. ............ 379/200 |
| 2003/0009667 | A1* | 1/2003 | Horiuchi et al. ............ 713/168 |
| 2003/0116969 | A1* | 6/2003 | Skinner et al. ............ 290/1 R |
| 2003/0161064 | A1* | 8/2003 | Hori et al. ............ 360/55 |
| 2003/0200458 | A1* | 10/2003 | Hori et al. ............ 713/200 |
| 2004/0010467 | A1* | 1/2004 | Hori et al. ............ 705/50 |
| 2004/0088510 | A1* | 5/2004 | Hori ............ 711/165 |
| 2004/0179691 | A1* | 9/2004 | Hori et al. ............ 380/277 |
| 2005/0076208 | A1* | 4/2005 | Hori et al. ............ 713/165 |
| 2005/0120232 | A1* | 6/2005 | Hori et al. ............ 713/193 |
| 2006/0116969 | A1* | 6/2006 | Hatanaka et al. ............ 705/71 |

FOREIGN PATENT DOCUMENTS

| | | |
|---|---|---|
| JP | 03-231337 | 10/1991 |
| JP | 5-46359 A | 2/1993 |
| JP | 6-202926 A | 7/1994 |
| JP | 9-74549 | 3/1997 |
| JP | 9-89082 | 3/1997 |
| JP | 10-003745 | 1/1998 |
| JP | 10-240629 | 9/1998 |
| JP | 10-283229 | 10/1998 |
| JP | 11-039450 | 2/1999 |
| JP | 11-120057 | 4/1999 |
| JP | 11-328982 | 11/1999 |
| JP | 2001-051889 | 2/2001 |
| JP | 2001-147864 | 5/2001 |
| JP | 2001-197292 A | 7/2001 |
| JP | 2001-230768 | 8/2001 |
| JP | 2001-249836 A | 9/2001 |
| JP | 2001-249855 | 9/2001 |
| JP | 2001-337600 | 12/2001 |
| JP | 2002-7263 A | 1/2002 |
| JP | 2002-189648 A | 7/2002 |
| WO | WO 00/08909 | 2/2000 |
| WO | WO 01/41356 A1 | 6/2001 |
| WO | WO 01/69842 A1 | 9/2001 |
| WO | WO 02/075550 A1 | 9/2002 |

* cited by examiner

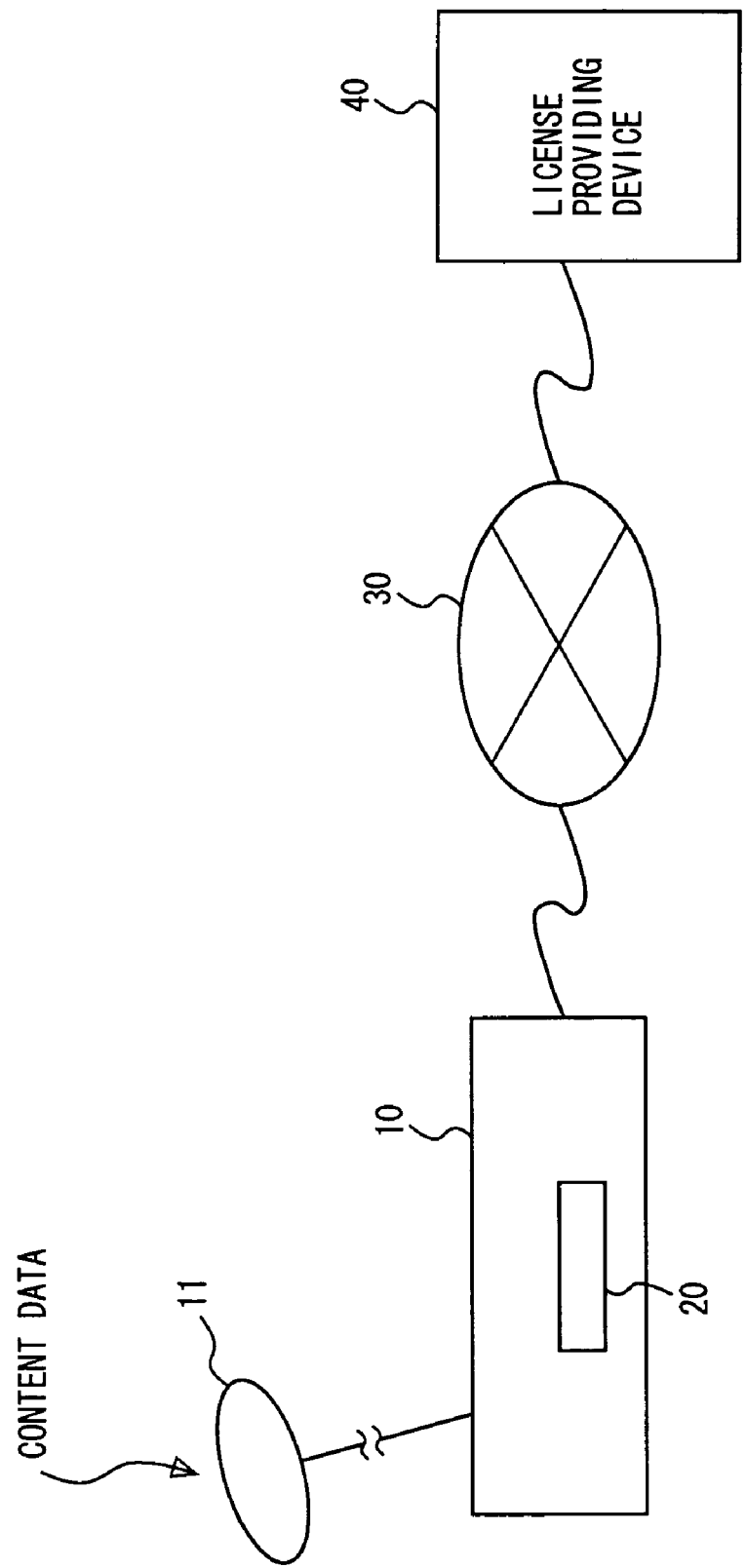

FIG. 2

| SYMBOL | NAME | ATTRIBUTE | CHARACTERISTICS |
|---|---|---|---|
| Dc | DATA | PECULIAR TO DATA | EX.:MOVIE, MUSIC, READING, EDUCATIONAL OR IMAGE DATA, OR GAME PROGRAM RECORDED AND MANAGED AS ENCRYPTED CONTENT DATA E(Kc, Dc) ENCRYPTED WITH Kc |
| Di | DATA INFORMATION | PECULIAR TO DATA | PLAINTEXT DATA RELATED TO Dc AND INCLUDING DID |
| DID | DATA ID | PECULIAR TO DATA | MANAGEMENT CODE FOR SPECIFYING Dc AND Kc |
| Kc | CONTENT KEY | PECULIAR TO DATA | SYMMETRIC KEY ENCRYPTING/DECRYPTING ENCRYPTED DATA |
| AC | CONTROL INFORMATION | PECULIAR TO LICENSE | RESTRICTIONS RELATED TO REPRODUCTION AND LICENSE HANDLING |
| LID | LICENSE ID | PECULIAR TO LICENSE | MANAGEMENT CODE FOR SPECIFYING LICENSE |
| LIC | LICENSE | PECULIAR TO LICENSE | GENERALLY REPRESENTING Kc//AC//DID//LID |

F I G. 3

| | SYMBOL | NAME | CHARACTERISTIC |
|---|---|---|---|
| LICENSE PROVIDING DEVICE | KPa | CERTIFICATION KEY | PUBLIC DECRYPTION KEY FOR VERIFYING CERTIFICATE BY CERTIFICATION AUTHORITY OPERATED BY LICENSE PROVIDER SIDE |
| | Ks1x | SESSION KEY | TEMPORARY KEY PRODUCED FOR EVERY LICENSE DISTRIBUTION SYMMETRIC KEY |
| DATA STORAGE DEVICE (HARD DISK) | KPa | CERTIFICATION KEY | PUBLIC DECRYPTION KEY FOR VERIFYING CERTIFICATE BY CERTIFICATION AUTHORITY OPERATED BY LICENSE PROVIDER SIDE |
| | KPcmy | CLASS PUBLIC KEY | ENCRYPTION KEY ASSIGNED TO CLASS (UNIT SUCH AS TYPE) OF DEVICE "y" IS IDENTIFIER IDENTIFYING CLASS |
| | Kcmy | CLASS PRIVATE KEY | ASYMMETRIC DECRYPTION KEY DECRYPTING DATA ENCRYPTED WITH CLASS PUBLIC KEY KPcmy |
| | Icmy | CLASS INFORMATION | INFORMATION DATA OF DEVICE AND CLASS PUBLIC KEY IN EACH CLASS |
| | Cmy | CLASS CERTIFICATE | Cmy=KPcmy//Icmy//E(Ka,H(KPcmy//Icmy)) CORRECTNESS IS VERIFIED WITH CERTIFICATION KEY KPa |
| | KPomz | INDIVIDUAL PUBLIC KEY | ENCRYPTION KEY MANAGED FOR EACH DATA STORAGE DEVICE "z" IS IDENTIFIER IDENTIFYING DATA STORAGE DEVICE |
| | Komz | INDIVIDUAL PRIVATE KEY | ASYMMETRIC DECRYPTION KEY DECRYPTING DATA ENCRYPTED WITH INDIVIDUAL PUBLIC KEY KPomz |
| | Ks1x | SESSION KEY | TEMPORARY KEY PRODUCED BY LICENSE PROVIDER SIDE FOR EVERY LICENSE TRANSMISSION SYMMETRIC KEY |
| | Ks2x | SESSION KEY | TEMPORARY KEY PRODUCED BY LICENSE RECEIVER SIDE FOR EVERY LICENSE TRANSMISSION SYMMETRIC KEY |
| REPRODUCING CIRCUIT | KPcpy | CLASS PUBLIC KEY | ENCRYPTION KEY ASSIGNED TO CLASS (UNIT SUCH AS TYPE) OF DEVICE "y" IS IDENTIFIER IDENTIFYING CLASS |
| | Kcpy | CLASS PRIVATE KEY | ASYMMETRIC DECRYPTION KEY DECRYPTING DATA ENCRYPTED WITH CLASS PUBLIC KEY KPcpy |
| | Icpy | CLASS INFORMATION | INFORMATION DATA OF DEVICE AND CLASS PUBLIC KEY IN EACH CLASS |
| | Cpy | CLASS CERTIFICATE | Cpy=KPcpy//Icpy//E(Ka,H(KPcpy//Icpy)) CORRECTNESS IS VERIFIED WITH CERTIFICATION KEY KPa |
| | Ks2x | SESSION KEY | TEMPORARY KEY PRODUCED BY LICENSE RECEIVER SIDE FOR EVERY LICENSE TRANSMISSION SYMMETRIC KEY |

F I G. 7
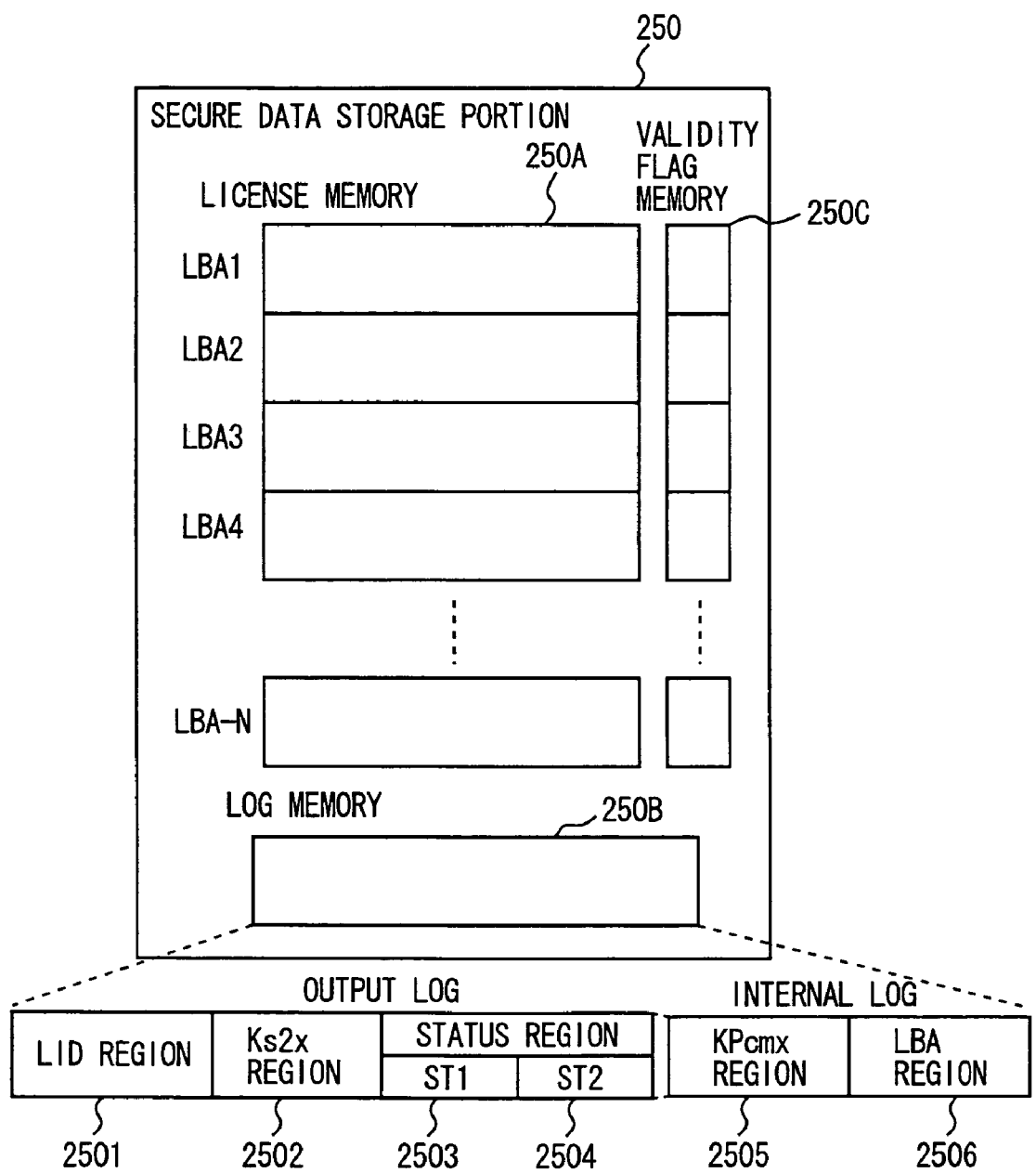

DATA STORING DEVICE FOR CLASSIFIED DATA

TECHNICAL FIELD

The present invention relates to a data storage device in a data distributing system, which allows copyright protection of content data in a digital form, and particularly to a data storage device, which can safely input and output licenses (decryption keys and usage rules) required for reproducing encrypted content data prepared by encrypting content data, can store many licenses, can safely input/output classified data requiring protection, and can safely resume the input/output of interrupted input/output of the classified data.

BACKGROUND ART

Owing to progress in digital communication networks such as the Internet in recent years, users of personal terminals can easily access network information.

In such digital communication networks, information is transmitted by digital signals. Even an individual user can copy music or movie data transmitted via the aforementioned digital communication network, and thereby can copy such data without degrading audio and/or image qualities.

Therefore, the copyright of the owner may be significantly infringed unless appropriate measures are taken for copyright protection when a copyrighted content such as music data or image data is transmitted over the digital communication network.

However, if copyright protection is given top priority, it may become impossible to distribute content data over the fast-growing digital communication network. This impairs an interest of the copyright owner, who can essentially collect predetermined copyright royalties for distribution of the copyrighted data.

Instead of the distribution over the digital communication network described above, distribution may be performed via record mediums storing digital data. In connection with the latter case, music data recorded on CDs (compact disks) on the market can be freely copied in principle onto magneto-optical disks (e.g., MDs) as long as copies are made only for the personal use. However, personal users performing digital recording or the like indirectly pay predetermined amounts in prices of digital recording devices or mediums as guaranty moneys to copyright owners.

In view of the fact that the music data copied from a CD to an MD is digital data, which does not substantially cause copy deterioration, devices and others are configured for copyright protection to prohibit further copying of the copied music data from the recordable MD to another MD.

In connection with the above, the public distribution itself of the content data such as music data and image data over the digital communication network is restricted by the public transmission right of the copyright owner, and therefore sufficient measures must be taken for the copyright protection in such distribution.

In the above case, it is necessary to prohibit unauthorized further copying of the content data such as music data or image data, which was once sent to the public over the digital communication network.

A data distribution system has been proposed for distributing content data over a digital communication network. In this data distribution system, a distribution server distributes content data to memory cards, which are data storage devices attached to terminal devices such as cellular phones. In this data distribution system, a public encryption key of the memory card, which is already certified by a certification authority, and its certificate are sent to the distribution server when requesting the distribution of the encrypted content data. After the distribution server confirms the reception of the certified certificate, the encrypted content data and a content key for decrypting the encrypted content data are sent to the memory card. When distributing the encrypted content data and the content key, the distribution server and the memory card generate session keys, which are different from those generated for other distribution processes. With the session keys thus generated, the public keys are encrypted, and the keys are exchanged between the distribution server and the memory card.

Finally, the distribution server sends the content key, which is encrypted with the public key peculiar to each memory card, and is further encrypted with the session key, as well as the encrypted content data to the memory card. The memory card stores the received content key and the encrypted content data in the memory card. In this operation, the license is stored in a license storage portion, which can ensure the safety.

When the encrypted content data recorded in the memory card is to be reproduced, the user connects the memory card to the reproduction terminal provided with a dedicated producing circuit, and thereby can reproduce the encrypted content data for enjoying it.

In the above system, usage rules are determined so that a content supplier or a copyright owner can instruct a manner of use in connection with reproduction and copying of the encrypted content data. The rules thus determined are distributed together with the content key so that each device can perform processing according to the usage rules.

The usage rules defines rules relating to copy/shift of the license between memory cards, rules such as restrictions on allowed times of reproduction in connection with output of the content key from the memory card, and rules relating to handling of reproduced contents.

In the data distribution system described above, the encrypted content data and the license are transmitted, e.g., between the distribution server and the memory card, or between the memory card and the reproduction terminal. The "licenses" generally represent the content key, usage rules, license ID for identifying the license and usage rules of contents already described. Such licenses are to be transmitted while ensuring sufficient security for the purpose of copyright protection.

In an operation of transmitting the license between devices, when ordinary transmission processing is being performed, the sender and the receiver mutually recognize the transmitted licenses, respectively, so that the license can be transmitted between the devices without any problem. However, when a failure such as power-down occurs in either of the devices or a communication path during the transmission of the license, the license may be lost during the transmission.

For the processing of, e.g., transmitting the license between the memory cards, the system is configured to prevent such a state that both the memory cards on the sender and receiver sides can simultaneously utilize the same license when storing the data, in view of the copyright protection, except for the case where the usage rules do not restrict the copying of the license. Thus, the license stored in the memory card on the sender side must be configured to become unavailable at the same as the output of the license to the memory card on the receiver side. In this configuration, such a state temporarily occurs that neither of the memory cards has stored the license in an available state. When the transmission processing is interrupted during the above state, the license, which is being transmitted, is lost. In the operation of receiving the license from the distribution server, the license may likewise be lost. In the case where the transmission of the license is interrupted, it is therefore important to determine whether the license is lost during the transmission thus interrupted, and to perform restoring or resending of the lost license in the optimum manner if the license was lost. For determining the loss of license, log information for specifying the interrupted transmission processing and the license must be stored efficiently in the memory card. It is also necessary that the memory card has a function of determining whether it has stored the license in question or not.

It can be reliably considered that the information transmission technology, which has been remarkably progressed in recent years, will further progress, and such progress will result in further advance in communication technology and increase in information amount. For these reasons, a data storage device of a large capacity, which can store various kinds of and a large number of content data, has been desired in the field of the data distribution system described above.

The data storage device of the large capacitance requires a data storage portion capable of storing a large number of licenses. When transmission of the license is interrupted in the above data distribution system, it is determined whether the license to be transmitted by the transmission thus interrupted is stored or not, and for this determination, search or retrieval is effected on the license storage portion, which can store a large number of licenses. However, it takes a long time for such retrieval processing, and this time increases with increase in number of the storable licenses.

According to a conventional system, the retrieval processing must be effected on the license storage portions one by one for the license determination, and the time required for the retrieval processing may cause a problem in the foregoing case.

DISCLOSURE OF THE INVENTION

Accordingly, the invention has been developed for overcoming the above problems, and an object of the invention is to provide a data storage device, which can rapidly determine a state of storage of a license to be currently transmitted in a license storage portion capable of storing a large number of licenses, and particularly, can achieve both protection of the license and rapid reprocessing in the case of interruption of the license transmission.

Also, it is an object of the invention to provide a data storage device, which can be applied not only to licenses but also to general classified data requiring protection similar to that for the license.

According to the invention, a data storage device performing input/output of classified data in accordance with predetermined input/output procedures for protection of the classified data, and storing the classified data, includes an interface portion externally exchanging data; a first storage portion storing the classified data; and a second storage portion storing log information related to the input/output of the classified data according to the predetermined input/output procedures and an address representing a storage position of the classified data to be input/output in the first storage portion.

Preferably, the data storage device further includes a control portion controlling the input/output of the classified data. The log information includes an identification code identifying the classified data to be input/output, and a first status information representing a state of storage of the classified data to be input/output in the first storage portion. The control portion operates in accordance with the predetermined input/output procedures to receive the identification code and the address of the classified data to be input/output via the interface portion, and to store the received identification code and address in the second storage portion, and operates in response to a request externally applied via the interface portion to determine the state of storage of the classified data in the first storage portion based on the identification code and the address stored in the second storage portion, and to renew the first status information based on the state of storage.

Preferably, the log information further includes a second status information recording a status of progression of the predetermined input/output procedures relating to the input/output of the classified data to be input/output, and the control portion renews the second status information in accordance with the progression of the predetermined input/output procedures.

Preferably, the log information further includes procedure specifying information specifying the predetermined input/output procedures, and the control portion renews the procedure specifying information in response to every new obtaining of the procedure specifying information.

Preferably, the data storage device further includes a cypher communication portion operating in accordance with the predetermined input/output procedures to establish a cypher communication path to a supplier or a receiver of the classified data via the interface portion, and to receive or transmit the classified data via the established cypher communication path. In an input procedure included in the predetermined input/output procedures for receiving and storing the classified data, the cypher communication portion receives the classified data in accordance with the input procedure, and the control portion receives the address via the interface portion, stores the received address in the second storage portion, and stores the classified data received by the cypher communication portion in a storage position on the first storage portion specified by the received address.

Preferably, in the input procedure, the cypher communication portion produces a first session key, and the control portion renews the procedure specifying information with the first session key in response to every production of the first session key by the cypher communication portion.

Preferably, the data storage device further includes a signing portion producing a signed log information prepared by affixing an electronic signature to the log information or a part of the log information. In a re-input procedure included in the predetermined input/output procedures for resuming the input procedure when the input procedure is interrupted, the control portion renews the first status information included in the log information stored in the second storage portion, obtains the log information from the second storage portion and applies the log information to the signing portion, the signing portion receives the log information including the renewed first status information to produce the signed log information, and the cypher communication portion transmits the signed log information produced by the signing portion via the established cypher communication path in accordance with the re-input procedure.

Preferably, in an output procedure included in the predetermined input/output procedures for externally outputting the classified data stored in the first storage portion, the control portion receives the address via the interface portion, stores the received address in the second storage portion, obtains the classified data from the storage position on the first storage portion specified by the received address, and applies the classified data to the cypher communication portion, and the cypher communication portion transmits the classified data received from the control portion in accordance with the output procedure.

Preferably, in the output procedure, the cypher communication portion receives an externally produced second session key, and the control portion renews the procedure specifying information with the received second session key in response to every reception of the second session key by the cypher communication portion.

Preferably, the data storage device further includes a log certifying portion verifying and certifying externally applied signed log information, and in a re-output procedure included in the predetermined input/output procedures for resuming the output procedure when the output procedure is interrupted, the cypher communication portion receives and applies the signed log information to the log certifying portion in accordance with the re-output procedure. The log certifying portion verifies the signed log information received from the cypher communication portion. The control portion determines whether the output procedure is interrupted or not, based on the log information stored in the second storage portion and the received signed log information when the received signed log information is certified. The control portion determines whether the storage position on the first storage portion specified by the address stored in the second storage portion can be restored to the storage state before interruption of the output procedure or not, when it is that whether the output procedure is interrupted. When it is determined that the restoring is possible, the control portion restores the storage position to the storage state attained before interruption of the output procedure,: and resumes the interrupted output procedure.

Preferably, the classified data includes the identification code peculiar to the classified data, and the control portion determines the storage state of the classified data in the first storage portion by specifying the classified data in accordance with the identification code included in the classified data stored in the storage position on the first storage portion specified by the address.

Preferably, in an input procedure included in the predetermined input/output procedures for receiving the classified data via the interface portion and storing the classified data in the first storage portion, the control portion interrupts the input procedure without storing the classified data in the first storage portion when mismatch occurs between the identification code included in the received classified data and the identification code included in the log information.

Preferably, in an output procedure included in the predetermined input/output procedures for outputting the classified data stored in the first storage portion via the interface portion, the control portion interrupts the output procedure without outputting the classified data when the identification code included in the classified data stored in the storage position on the first storage portion specified by the address does not match with the identification code included in the log information.

Preferably, the data storage device further includes a signing portion for producing signed data for the log information, and producing signed log information by affixing the produced signed data to the log information. In a re-input procedure performed for resuming an input procedure for receiving the classified data via the interface portion and storing the classified data in the first storage portion, when the input procedure is interrupted, the control portion outputs the signed log information produced by the signing portion via the interface portion in a re-input procedure for resuming the interrupted input procedure.

Preferably, the data storage portion further includes a log certifying portion verifying and certifying an additional signed log information prepared by affixing a signed data for an additional log information of the receiver to the additional log information, and received from the receiver of the classified data via the interface portion. In a re-output procedure performed for resuming an output procedure for outputting the classified data stored in the first storage portion via the interface portion, when the output procedure is interrupted, the log certifying portion verifies correctness of the additional signed log information received from the receiver of the classified data in the interrupted output procedure. When the additional signed log information is not certified, or when the additional signed log information is certified and it is determined based on the additional signed log information and the log information stored in the second storage portion that the output procedure is not interrupted, the control portion interrupts the re-output procedure.

Preferably, the classified data is a decryption key for decrypting and using encrypted content data, and the data storage device further includes a third storage portion storing the encrypted content data.

BRIEF DESCRIPTION OF THE DRAWINGS

FIG. 1 is a schematic view showing a concept of a data distribution system.

FIG. 2 illustrates characteristics of data, information and others transmitted in the data distribution systems shown in FIG. 1.

FIG. 3 illustrates characteristics of data, information and others used for certification in the data distribution systems shown in FIG. 1.

FIG. 7 shows a memory structure of a secure data storage portion in the hard disk shown in FIG. 6.

BEST MODES FOR CARRYING OUT THE INVENTION

Figure 4:
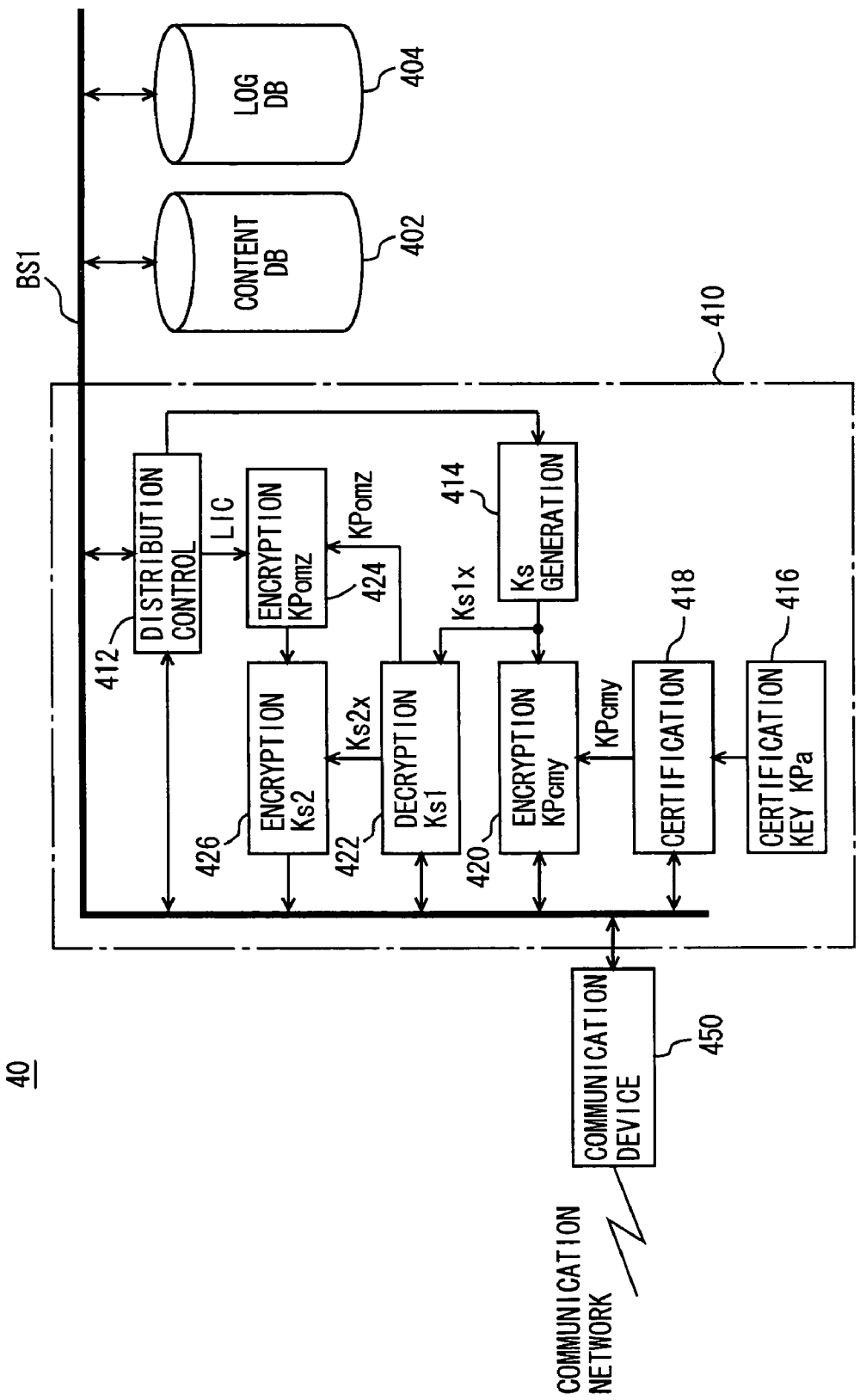
FIG. 4 is a schematic block diagram showing a structure of a license providing device shown in FIG. 1.

Embodiments of the invention will now be described with reference to the drawings. The same or similar parts or portions bear the same reference numbers in the figures, and description thereof is not repeated.

FIG. 1 is a schematic diagram showing a concept of a whole structure of a data distribution system, in which a data storage device according to the invention obtains encrypted content data and a license for decrypting the encrypted content data.

The following description will be given by way of example on a data distribution system, in which terminal device 10 receives a picture data distributed over a digital broadcasting network, and stores the data in a hard disk 20, which is a data storage device attached to terminal device 10. In this system, terminal device 10 is connected to a bidirectional network 30, and receives a license for decrypting encrypted picture data over network 30 from a license providing device 40 for storing it on hard disk 20. Terminal device 10 reproduces the encrypted picture data by an internal reproducing circuit (not shown) dedicated to such reproduction. However, as will become apparent from the following description, the present invention is not restricted to such a case. The present invention is applicable to distribution of other copyrighted materials, i.e., content data such as image data, music data, educational data, reading or recitation data or book data, or programs, e.g., of games. Likewise, the data storage device is not restricted to the hard disk, and may be applied to another data storage device such as a memory card.

Referring to FIG. 1, terminal device 10 receives the encrypted picture data, which is distributed over the digital broadcasting network, via an antenna 11, and stores it on hard disk 20. This picture data may also be referred to as "content data" hereinafter. License providing device 40, which manages and distributes the license including a content key to be used for decrypting the encrypted content data, performs certification processing by determining whether hard disk 20 attached to terminal device 10, which made access for distribution of the license, has correct certification data or not, i.e., whether hard disk 20 is a correct data storage device having a license managing function or not. Only when hard disk 20 is the correct data storage device, license providing device 40 sends the license encrypted in a predetermined encryption manner, which allows decryption only by hard disk 20, to terminal device 10. When terminal device 10 receives the encrypted license via a modem connected to network 30, terminal device 10 sends the encrypted license to hard disk 20 attached thereto.

For example, hard disk 20 in FIG. 1 is removable from terminal device 10. Hard disk 20 attached to terminal device 10 receives the encrypted license received by terminal device 10, decrypts the license encrypted for protecting a copyright and stores the license on hard disk 20. For reproducing the encrypted content data corresponding to the license, terminal device 10 is supplied with the content key included in the license and the encrypted content data.

A user of terminal device 10 can reproduce the content data, which can be decrypted with the content key in terminal device 10.

According to the above structure, the user of terminal device 10, which received and stored the encrypted content data, can receive the license, and thus can reproduce the content data only when terminal device 10 uses hard disk 20, which has a license management function and includes correct certification data.

In the above data distribution system, the provider of the encrypted content data is a broadcasting server of a digital broadcasting company or the like. However, the provider may be license providing device 40 managing the license of the contents, may be a distribution server, which is connected via a digital communication network such as the Internet, other than license providing device 40, or may be a copy from another user. Thus, the encrypted content data itself may be issued from any portion, and may be received by any portion. In summary, the copyright of the content data can be protected as long as the license allowing decryption of the encrypted content data is controlled strictly.

According to the embodiment of the invention, when the processing is performed to transmit the license between hard disk 20, terminal device 10 and license providing device 40, the provider of the license required for reproducing the encrypted content data performs the verifying and checking processing on the receiver or destination so as to prevent the output of license to an unauthorized device. Further, the system can prevent loss of the license due to interruption of the license transmitting processing, and can prevent double presence of the license. A structure of this system will now be described.

FIG. 2 illustrates characteristics of data, information and others used for transmission in the data distribution systems shown in FIG. 1.

Data Dc is the content data, which is the picture data in this embodiment. Data Dc is encrypted into a form allowing decryption with a content key Kc so that encrypted content data E(Kc, Dc) is produced and distributed to users of terminal devices 10 over the digital broadcasting network.

In the following description, the expression E(X, Y) represents that data Y is encrypted into a form allowing decryption with a decryption key X. Together with data Dc, the network distributes additional information Di, which is plaintext information relating, e.g., to copyright of the content data or server access.

License ID (LID), which is a management code for specifying the distribution of the license and specifying each license, is transmitted between license providing device 40 and hard disk 20 via terminal device 10. The license includes data ID (DID), which is a code for identifying data Dc and content key Kc, and control information AC, which relates to restrictions on handling of the license and reproduction in the data storage device, and more specifically relates to the number of licenses, function restrictions and others determined in accordance with designation by the user side.

In the following description, content key Kc and control information AC as well as IDs (DID and LID) will be collectively referred to as a license LIC. DID is identification information assigned to a pair of data Dc and content key Kc, and thus is identification information for identifying encrypted data E(Kc, Dc). In addition to license LIC, DID is also included in additional information Di, which is always handled together with encrypted data E(Kc, Dc) in a manner allowing reference to it.

FIG. 3 illustrates characteristics of data, information and others for certification, which are used in the data distribution system shown in FIG. 1.

Reproducing circuits arranged in the data storage device such as hard disk 20 as well as terminal device 10 are provided with class public keys KPcmy and KPcpy peculiar to them. Class public keys KPcmy and KPcpy can be decrypted with a class private key Kcmy peculiar to the data storage device and a class private key Kcpy peculiar to the reproducing circuit, respectively. These class public keys and class private keys have values, which depend on the types of the reproducing circuit and the data storage device. These class public keys and class private keys are shared by a unit, which is referred to as a "class". A character "y" represents an identifier for identifying the class. The class depends on a manufacturer, a kind of the product, a production lot and others.

Cmy is employed as a class certificate of the data storage device. Cpy is employed as a class certificate of the reproducing circuit. These class certificates have information depending on the classes of the data storage device and the reproducing circuit.

The data storage device stores its class certificate Cmy in the form of KPcmy//Icmy//E(Ka, H(KPcmy//Icmy)) at the time of shipment. The reproducing circuit stores its class certificate Cpy in the form of KPcpy//Icpy//E(Ka, H(KPcpy//Icpy)) at the time of shipment. Expression of "X//Y" represents coupling between X and Y, and H(X) represents a hash value of data X calculated by the hash function. Master key Ka is a private encryption key used for preparing these class certificates. Master key Ka is shared by the whole data distribution system, and is safely managed and operated by a certification authority (not shown). Class information Icmy and Icpy are information data including information related to devices in each class and the class public key.

E(Ka, H(KPcmy//Icmy)) and E(Ka, H(KPcpy//Icpy)) are signed data prepared by affixing electronic signatures to KPcmy//Icmy and KPcpy//Icpy, respectively.

The certification authority is a public third organization preparing the signature data, and produces signature data E(Ka, H(KPcmy//Icmy)) and E(Ka, H(KPcpy//Icpy)).

Certification key KPa is used for verifying the class certificate, and is a pubic key paired with master key Ka.

As keys for safely and reliably sending license LIC to the data storage device, the system employs an individual public key KPomz managed corresponding to each medium, i.e., each data storage device as well as individual private key Komz allowing decryption of the data encrypted with individual public key KPomz. The character "z" in these expressions is an identifier for individually identifying the data storage device.

Every time the data transmission is performed, the data distribution system uses session keys Ks1x and Ks2x produced by license providing device 40, the data storage device (hard disk 20) and terminal device 10.

Session keys Ks1x and Ks2x are symmetric keys generated for each "session", i.e., the unit of communication between license providing device 40, the data storage device (hard disk 20) and the reproducing circuit of terminal device 10, or the unit of access thereto. The "session" includes "distribution session" for distributing the license from license providing device 40 to the data storage device (hard disk 20), "copy/shift session" for copying or shifting the license between the data storage devices, and "reproduction permission session" for outputting the license from the data storage device (hard disk 20) to the reproducing circuit of terminal device 10.

Session keys Ks1x and Ks2x have values peculiar to each session so that these are managed by license providing device 40, the data storage device (hard disk 20) and the reproducing circuit of terminal device 10. More specifically, when the license is to be transmitted, session key Ks1x is generated for each session by the sender side of the license, and session key Ks2x is generated for each session by the receiver side of the license. The character "x" is an identifier for identifying a series of processing in the session. In each session, these session keys are mutually transmitted between the devices. Each device receives the session key produced by the other device, and performs the encryption with the received session key. Then, the device sends license LIC or a part of license LIC including the content key so that the degree of security in the session can be improved.

FIG. 4 is a schematic block diagram showing a structure of license providing device 40 shown in FIG. 1.

License providing device 40 includes a content database (DB) 402 holding the licenses to be managed, a log database 404 storing all communication records in the distribution session for distributing the license, a data processing portion 410 transmitting data to and from content database 402 and log database 404 via a bus BS1 and effecting predetermined processing on it, and a communication device 450 transmitting the data between terminal device 10 and data processing portion 410 over network 30.

Data processing portion 410 includes a distribution control portion 412 for controlling the operation of data processing portion 410 in accordance with the data on bus BS1, a session key generating portion 414 for generating session key Ks1x in the distribution session under control of distribution control portion 412, and a KPa holding portion 416 holding certification key KPa. Data processing portion 410 also includes a certifying portion 418, which receives class certificate Cmy of the data storage device via communication device 450 and bus BS1, performs decryption processing on signature data E(Ka, H(KPcmy//Icmy)), which is a second half of class certificate Cmy, with certification key KPa received from KPa holding portion 416, performs calculation of the hash value of KPcmy//Icmy, which is a first half of class certificate Cmy, and verifies class certificate Cmy by comparing and checking the results of the above decryption processing and calculation. Data processing portion 410 further includes an encryption processing portion 420 encrypting session key Ks1x produced by session key generating portion 414 with class public key KPcmy extracted from class certificate Cmy, and a decryption processing portion 422 decrypting the data encrypted with session key Ks1x.

Data processing portion 410 further includes an encryption processing portion 424, which encrypts license LIC applied from distribution control portion 412 with individual public key KPomz of the data storage device applied from decryption processing portion 422, and an encryption processing portion 426, which further encrypts the output of encryption processing portion 424 with session key Ks2x generated by the data storage device and applied from decryption processing portion 422.

Further, individual public key KPomz and session key Ks2x are provided after being encrypted with session key Ks1x. Decryption processing portion 422 decrypts them to obtain individual public key KPomz and session key Ks2x.

Figure 5:
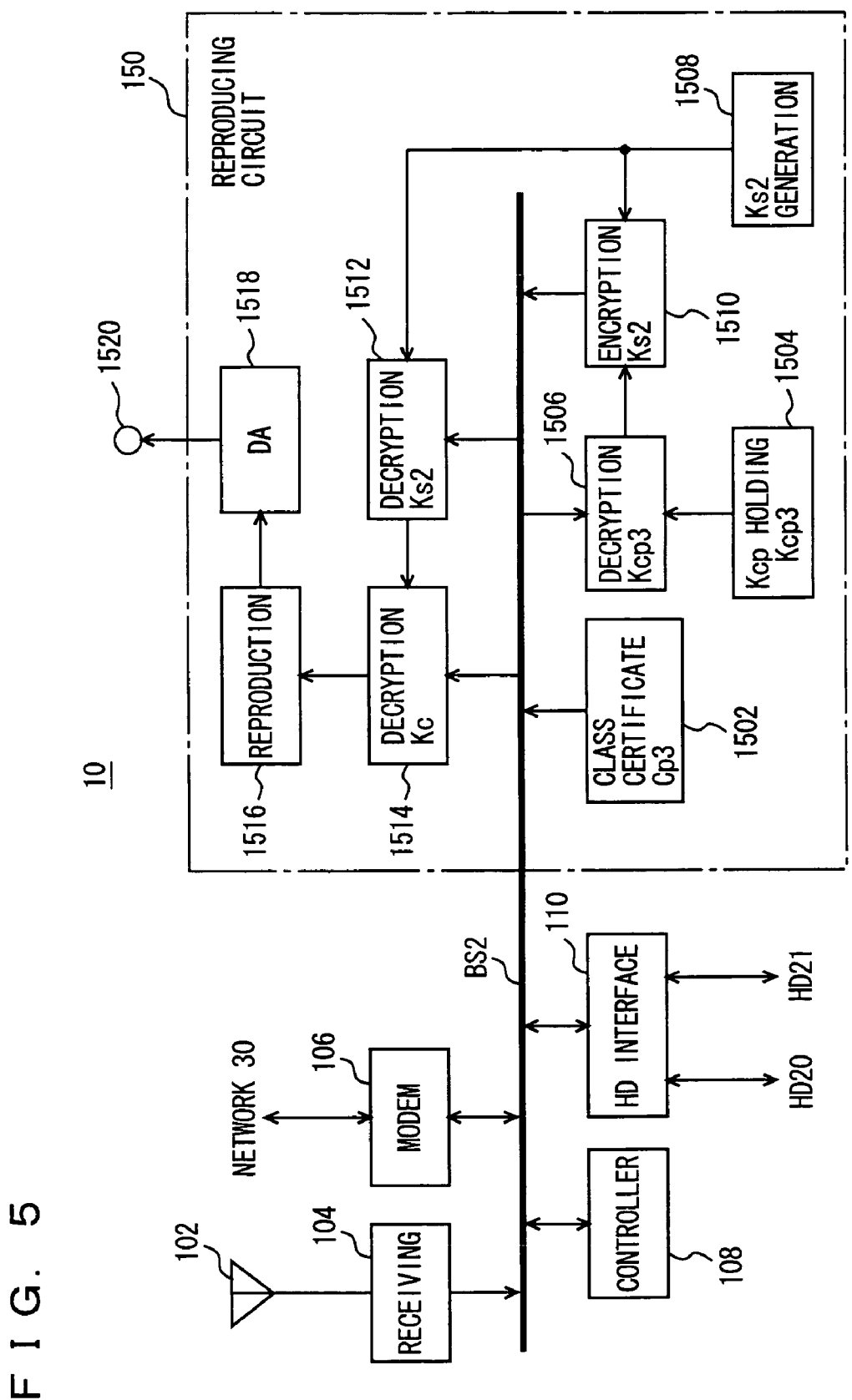
FIG. 5 is a schematic block diagram showing a structure of a terminal device shown in FIG. 1.

FIG. 5 is a schematic block diagram showing a structure of terminal device 10 shown in FIG. 1.

Terminal device 10 includes an antenna 102 receiving a signal sent over the digital broadcasting network, a receiving portion 104, which operates to receive the signal from antenna 102 and convert it into a baseband signal, or operates to modulate data to be sent from antenna 102 and apply it to antenna 102, a modem 106 connecting terminal device 10 to network 30, a bus BS2 transmitting data between various portions in terminal device 10, a controller 108 controlling an operation of terminal device 10 via bus BS2, a hard disk interface portion 110 controlling transmission of data between hard disk 20 and bus BS2, and a reproducing circuit 150 reproducing the content data based on the encrypted content data and the license stored on hard disk 20.

Reproducing circuit 150 includes a certification data holding portion 1502 holding class certificate Cpy already described. It is assumed that class y of reproducing circuit 150 is equal to three (y=3).

Reproducing circuit 150 also includes a Kcp holding portion 1504 holding a class private key Kcp3, which is a decryption key peculiar to the class, a decryption processing portion 1506 performing decryption with class private key Kcp3, a session key generating portion 1508, which generates a session key Ks2x, e.g., based on a random number in the reproduction permission session, an encryption processing portion 1510 encrypting session key Ks2x generated by session key generating portion 1508 with session key Ks1x generated by hard disk 20, a decryption processing portion 1512 decrypting content key Kc, which is encrypted with session key Ks2x, with session key Ks2x, a decryption processing portion 1514, which receives encrypted content data E(Kc, Dc) from bus BS2, and decrypts it with content key Kc sent from decryption processing portion 1512 to provide data Dc to a reproducing portion 1516, reproducing portion 1516 receiving and reproducing content data Dc provided from decryption processing portion 1514, a D/A converter 1518 converting the output of reproducing portion 1516 from digital signals to analog signals, and a terminal 1520 for providing the output of D/A converter 1518 to an external output device (not shown) such a display monitor.

For improving security, reproducing circuit 150 is preferably formed of a semiconductor device of one-chip structure. Further, it is preferable that reproducing circuit 150 is formed of an anti-tamper module, which effectively prevents analysis, which may be executed externally.

Operations in the respective sessions of various components of terminal device 10 will be described later in detail with reference to flowcharts.

Figure 6:
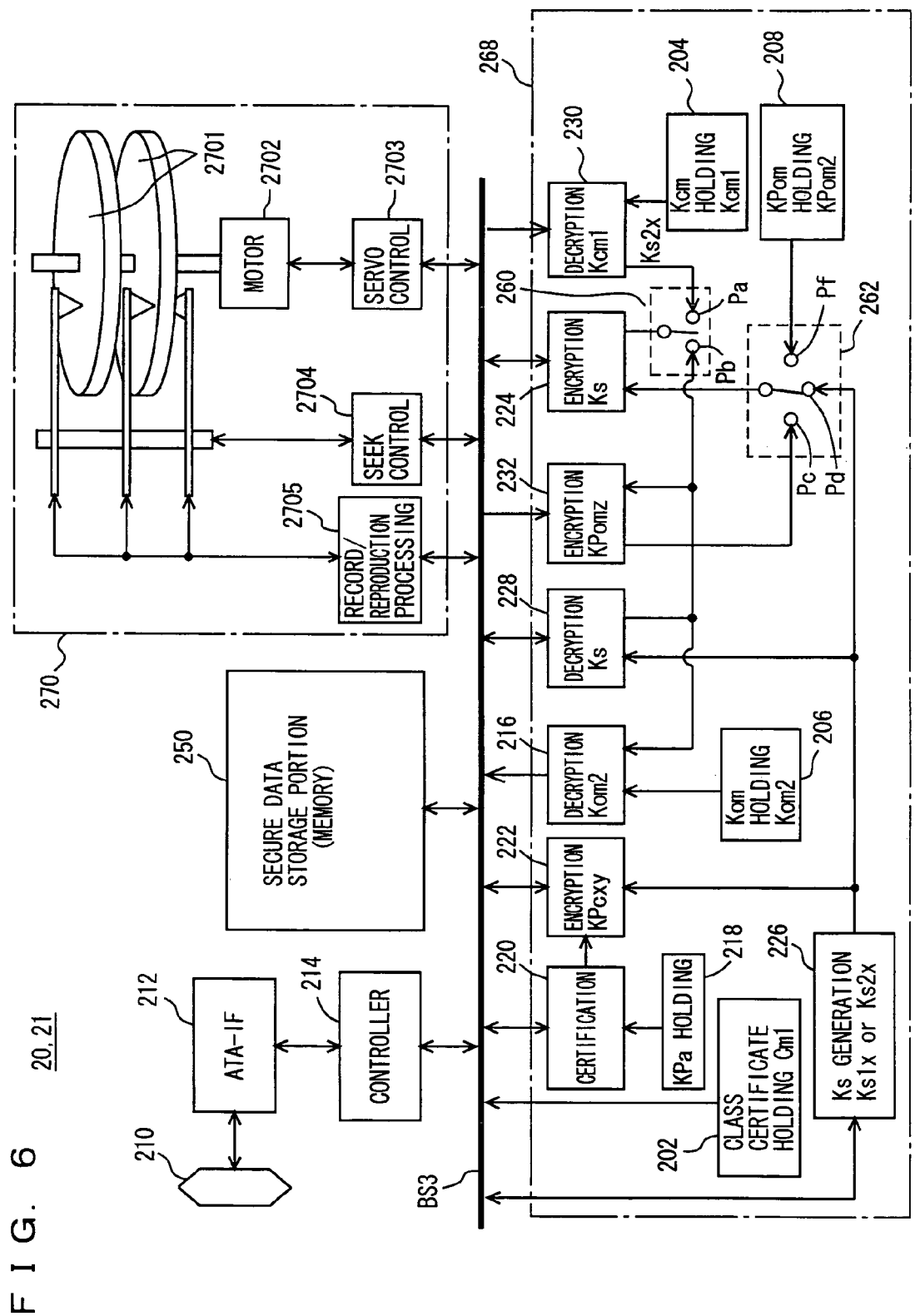
FIG. 6 is a schematic block diagram showing a structure of a hard disk attached to the terminal device shown in FIG. 1.

FIG. 6 is a schematic block diagram showing a structure of hard disk 20 shown in FIG. 1.

As already described, class public key KPcmy and class private key Kcmy are employed for the hard disk, and class certificate Cmy is also employed for the hard disk. In hard disk 20, it is assumed that the natural number y is equal to 1 (y=1). The natural number z identifying hard disk 20 is equal to 2 (z=2).

Referring to FIG. 6, hard disk 20 includes a cypher communication portion 268, a secure data storage portion 250, a normal data storage portion 270, a terminal 210, an ATA (AT-Attachment) interface portion 212 and a controller 214.

Terminal 210 physically and electrically connects hard disk 20 to hard disk interface portion 110 of terminal device 10. ATA interface portion 212 transmits signals via hard disk interface portion 110 of terminal device 10 and terminal 210. A bus BS3 serves as a data transmission path in hard disk 20.

Cypher communication portion 268 includes a certification data holding portion 202, which holds certification data KPcm1//Icm1//E(Ka, H(KPcm1//Icm1)).as class certificate Cm1, a Kcm holding portion 204 holding class private key Kcm1, a Kom holding portion 206 holding individual private key Kom2, and a KPom holding portion 208 holding individual public key KPom2 allowing decryption with individual private key Kom2.

As described above, owing to provision of the encryption key of the data storage device; i.e., the hard disk drive, the distributed content data and the encrypted content key for each hard disk drive can be managed independently of those for the other hard disk drive, as will be described below.

Cypher communication portion 268 further includes a decryption processing portion 216 performing decryption with individual private key Kom2 provided from Kom holding portion 206, a certifying portion 220, which receives certification key KPa from a KPa holding portion 218, and decrypts the data provided onto bus BS3 with certification key KPa to provide a result of the decryption to controller 214, and an encryption processing portion 224 encrypting the data, which is selectively applied via a selector switch 262, with session key Ks1x or Ks2x applied selectively by a selector switch 260, and providing it onto bus BS3.

Cypher communication portion 268 further includes a session key generating portion 226 generating session keys Ks1x and Ks2x in each of the distribution, copy/shift and reproduction permission sessions, an encryption processing portion 222 encrypting session key Ks1x generated by session key generating portion 226 with class public key KPcpy or KPcmy obtained by certifying portion 220, and decryption processing portion 228 receiving the data, which is encrypted with session key Ks1x or Ks2x generated by session key generating portion 226, and decrypting it with session key Ks1x or Ks2x.

Cypher communication portion 268 further includes a decryption processing portion 230 receiving the data encrypted with class public key KPcm1, and decrypting it with class private key Kcm1, and an encryption processing portion 232, which encrypts license LIC with individual public key KPomz (z≠2) received from a hard disk 21 in the destination when license LIC is to be shifted or copied from hard disk 20 to hard disk 21.

Secure data storage portion 250 stores license LIC and the log, which is a record of processing of the sessions processed by hard disk 20. License LIC is stored in a license memory 250A of secure data storage portion 250, and the log is stored in a log memory 250B of secure data storage portion 250. Secure data storage portion 250 is a storage region, which is formed of, e.g., a semiconductor memory, and does not allow external and direct access thereto.

FIG. 7 shows a memory structure in secure data storage portion 250.

Referring to FIG. 7, license memory 250A can store a plurality of licenses LIC (content key Kc, control information AC, license ID (LID) and data ID (DID)) corresponding to the fact that hard disk 20 can store a plurality of content data.

In hard disk 20, licenses LIC stored in license memory 250A are managed according to storage addresses in secure data storage portion 250. This storage address will be referred to as a "LBA" or "logical block address", hereinafter. All licenses LIC stored or output in each session are specified by the logical block addresses.

Secure data storage portion 250 is provided with validity flag memories 250C. Validity flag memories 250C are provided corresponding to logical block addresses specifying the storage positions on license memory 250A, and store flags representing validity/invalidity of the licenses stored at the positions specified by the corresponding logical block addresses, respectively.

When the flag in validity flag memory 250C is "valid", license LIC stored in 5 the storage position on license memory 250A specified by the logical block address corresponding to the flag can be used so that the user can reproduce the content data corresponding to this license LIC, or can perform the shift or copy of this license LIC.

When the flag in validity flag memory 250C is "invalid", license LIC stored in the storage position on license memory 250A specified by the logical block address corresponding to the flag cannot be used so that controller 214 of hard disk 20 rejects license LIC specified by this logical block address. This state is equivalent to that, in which license LIC is erased. Therefore, the user cannot reproduce the content data corresponding to license LIC. The flag in this validity flag memory 250C becomes valid when the license is newly stored, and becomes invalid when the license is shifted.

Log memory 250B includes a license ID region 2501 storing license ID (LID), which specifies license LIC to be handled in the session, a Ks2x region 2502 storing session key Ks2x, which is produced by the data storage device on the receiver side of license LIC in the session, an ST1 region 2503 storing a status ST1 representing a status of processing in the current session, an ST2 region 2504 storing a status ST2, which represents a storage state of the license corresponding to the license ID stored in license ID region 2501, a KPcmx region 2505, in which the data storage device on the sender side stores class public key KPcmx of the data storage device on the receiver side when outputting the license for the shift/copy, and an LBA region 2506 storing the logical block address indicated for outputting or storing license LIC in the session. In accordance with progression of a series of sessions, the data in the respective regions described above are renewed or referred to. Status ST1 represents one of four statuses of "waiting for reception", "received", "waiting for sending" and "sent", and status ST2 represents one of three statuses of "data present", "no data" and "shifted".

When the session is interrupted due to an unexpected failure occurred during the session, a storage state of license LIC, which is being transmitted in the interrupted session, is determined based on the license ID stored in LID region 2501 of log memory 250B as well as logical block address stored in LBA region 2506, and status ST2 is renewed according to a result of this determination. The sender side of the license in the interrupted session receives license LIC, session key Ks2x and statuses ST1 and ST2, which are stored in log memory 250B on the license receiver side, and checks the contents of the log recorded on the sender side and the received license LIC, session key Ks2x and statuses ST1 and ST2. Thereby, it is determined whether retransmission of the license is allowed or not.

Session key Ks2x is stored for specifying each session, and the fact that session key Ks2x is shared represents that the designation of the license to be transmitted and the processing thereof are shared.

The storage state of the license in license memory 250A must be determined (the presence of the license must be determined), e.g., when the interruption of processing in a certain session occurs particularly in hard disk 20 having license memory 250A capable of storage of a large number of licenses. In this case, the above structure allows easy execution of such determination and renewal of status ST2.

When the determination is performed for the retransmission, the receiver side of the license provides license ID (LID), session key Ks2x and statuses ST1 and ST2, which are stored in log memory 250B, to the sender side of the license, and these license ID (LID), session key Ks2x and statuses ST1 and ST2 will be collectively referred to as an output log. Class public key KPcmx and the logical block address on the receiver side, which are stored in log memory 250B and are referred to only in hard disk 20, will be collectively referred to as an internal log.

When the output log is output, a storage state of the license in license memory 250A is stored in status ST2 based on license ID (LID) stored in log memory 250B as well as the logical block address thereof, whereby the output log is materialized.

Details will be described later with reference to flowcharts illustrating the respective sessions.

Referring again to FIG. 6, normal data storage portion 270 stores the encrypted content data. Normal data storage portion 270 includes a disk-like magnetic record medium 2701 storing the data, an electric motor 2702 rotating magnetic record medium 2701, a servo-controller 2703 controlling motor 2702, a seek control portion 2704 controlling a position of a magnetic head on magnetic record medium 2701, and a record/reproduction processing portion 2705.instructing a magnetic head to record or reproduce the data. Normal data storage portion 270 has substantially the same structure as that of a known hard disk, and will not be described in detail.

Controller 214 further controls the operations in hard disk 20 such as external transmission of the data via ATA interface portion 212, determination relating to the output of license based on control information AC and management of secure data storage portion 250.

Controller 214, cypher communication portion 268 and secure data storage portion 250 are formed in anti-tamper module region.

Operations in the respective sessions of the data distribution system shown in FIG. 1 will now be described.

[Distribution]

First, description will be given on the operation of distributing the license from license providing device 40 to hard disk 20 attached to terminal device 10 in the data distribution system shown in FIG. 1.

Figure 8:
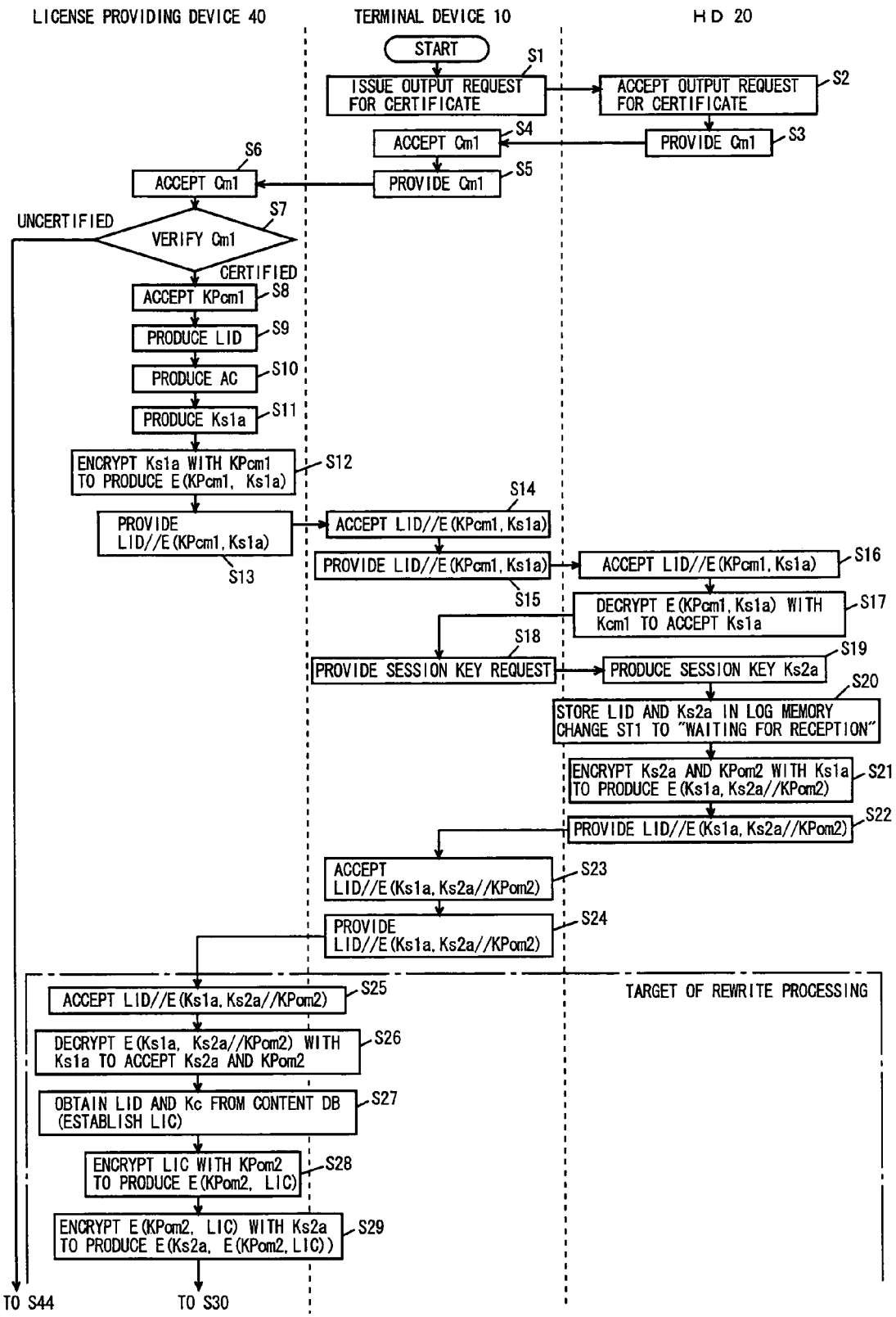
FIG. 8 is a first flowchart illustrating distribution processing in the data distribution systems shown in FIG. 1.
Figure 9:
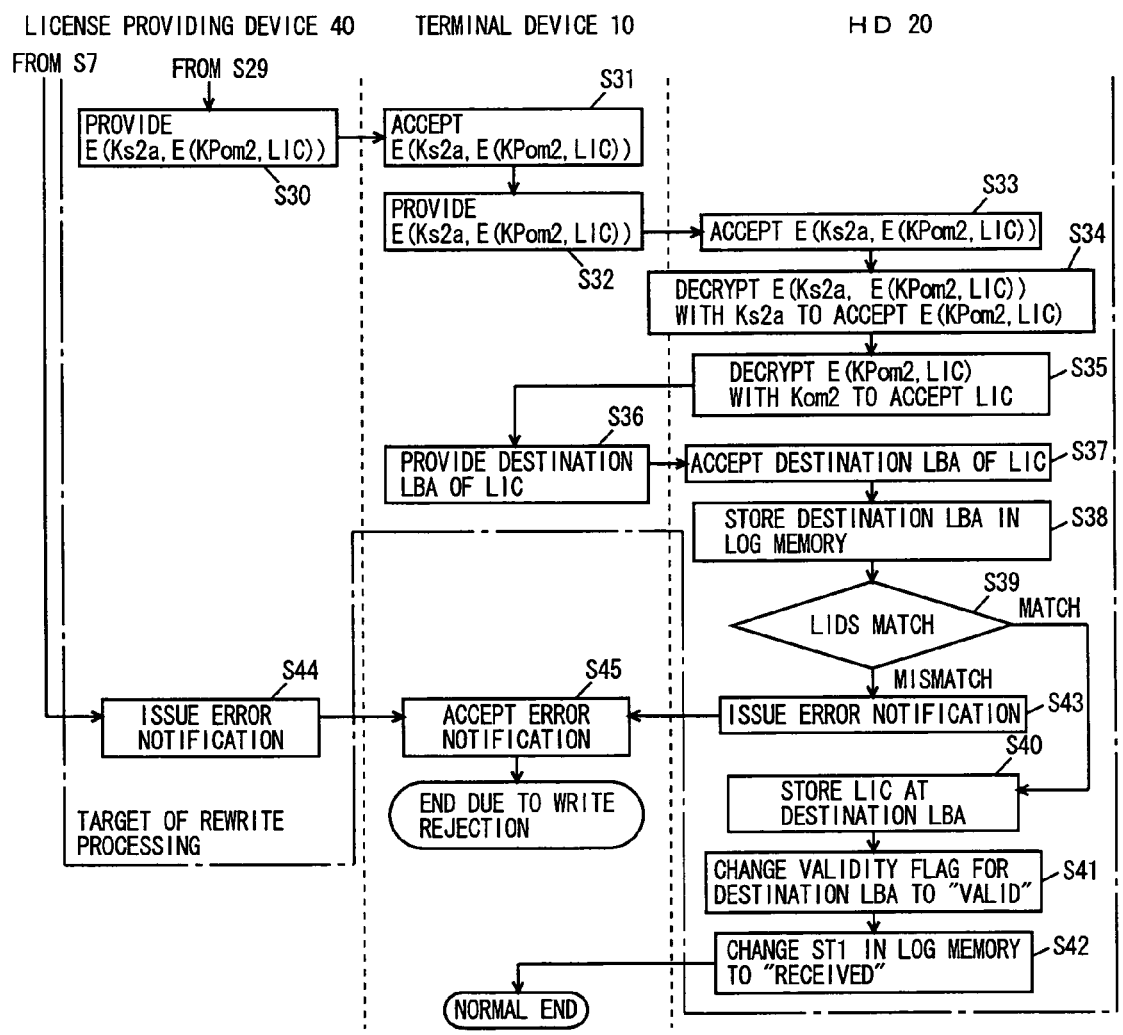
FIG. 9 is a second flowchart illustrating the distribution processing in the data distribution systems shown in FIG. 1.

FIGS. 8 and 9 are first and second flowcharts illustrating processing (distribution session) of the data distribution system shown in FIG. 1, respectively. More specifically, these flowcharts illustrate the processing, in which a user of terminal device 10 requests, via user's terminal device 10, the license distribution of the encrypted content data, and thereby license providing device 40 distributes the license to hard disk 20 attached to terminal device 10.

Before start of the processing in FIG. 8, the user of terminal device 10 connects terminal device 10 to network 30 via modem 106, and thereby connects terminal device 10 to license providing device 40 via network 30. The following description is based on the premise that the above operations are already performed.

Referring to FIG. 8, when the user of terminal device 10 requests the distribution of the license of intended content data, controller 108 of terminal device 10 provides an output request for the class certificate to hard disk 20 via hard disk interface portion 110 (step S1). When controller 214 of hard disk 20 accepts the output request for the class certificate via terminal 210 and ATA interface portion 212 (step S2), it reads class certificate Cm1 =KPcm1//Icm1//E(Ka, H(KPcm1//Icm1)) from certification data holding portion 202 via bus BS3, and provides class certificate Cm1 to terminal device 10 via ATA interface portion 212 and terminal 210 (step S3).

When controller 108 of terminal device 10 accepts class certificate Cm1 sent from hard disk 20 via hard disk interface portion 110 and bus BS2 (step S4), it sends class certificate Cm1 thus accepted to license providing device 40 via modem 106 and network 30 (step S5).

When license providing device 40 receives class certificate Cm1 from terminal device 10 (step S6), it verifies whether received class certificate Cm1 is correct or not (step S7). The verifying processing is performed as follows.

When license providing device 40 accepts class certificate Cm1 KPcm1//Icm1//E(Ka, H(KPcm1//Icm1)), certifying portion 418 decrypts signature data E(Ka, H(KPcm1//Icm1)), which is included in class certificate Cm1 provided from hard disk 20, with certification key KPa. Further, certifying portion 418 calculates the hash value of KPcm1//Icm1 included in class certificate Cm1, and compares it with the value of H(KPcm1//Icm1) decrypted with certification key KPa. When distribution control portion 412 determines, from the result of the decryption by certifying portion 418, that the foregoing decryption was performed and matching with the hash value occurred, certifying portion 418 certifies the certificate.

When class certificate Cm1 is certified in step S7, distribution control portion 412 approves class certificate Cm1, and accepts class public key KPcm1 (step S8). Next processing is then performed in a step S9. When the class certificate is not certified, distribution control portion 412 does not approve class certificate Cm1, and provides an error notification to terminal device 10 without accepting class certificate Cm1 (step S44 in FIG. 9). When terminal device 10 accepts the error notification (step S45 in FIG. 9), the distribution session ends.

As a result of the certification, when it is determined in license providing device 40 that the access is made from the terminal device, which is provided with the hard disk having the correct class certificate, class public key KPcm1 is accepted in step S8, and distribution control portion 412 produces license ID (LID) (step S9), and further produces control information AC (step S10). Session key generating portion 414 generates a session key Ks1a for distribution (step S11). Encryption processing portion 420 encrypts session key Ks1a with class public key KPcm1, which corresponds to hard disk 20 and is obtained by certifying portion 418, and thereby encrypted data E(KPcm1//Ks1a) is produced (step S12).

Distribution control portion 412 handles license ID (LID) and encrypted session key Ks1a as one data series LID//E(KPcm1//Ks1a), and externally provides it via bus BS1 and communication device 450 (step S13).

When terminal device 10 receives LID//E(KPcm1//Ks1a) over network 30 (step S14), it provides received LID//E(KPcm1//Ks1a) to hard disk 20 (step S15). Controller 214 of hard disk 20 accepts LID//E(KPcm1//Ks1a) via terminal 210 and ATA interface portion 212 (step S16). Controller 214 provides accepted E(KPcm1//Ks1a) to decryption processing portion 230 via BS1. Decryption processing portion 230 performs the decryption processing with class private key Kcm1 peculiar to hard disk 20 held in Kcm holding portion 204 to obtain session key Ks1a, and accepts session key Ks1a (step S17).

When controller 214 of hard disk 20 confirms the acceptance of session key Ks1a produced by license providing device 40, it notifies terminal device 10 of this acceptance via ATA interface portion 212 and terminal 210. When controller 108 of terminal device 10 accepts, via hard disk interface portion 110 and bus BS2, the notification that hard disk 20 accepted session key Ks1a, it provides a notification, which requests production of the session key to be produced in the distribution by hard disk 20, to hard disk 20 via bus BS2 and hard disk interface portion 110 (step S18). When controller 214 of hard disk 20 accepts the notification of request for session key production via terminal 210 and ATA interface portion 212, controller 214 instructs session key generating portion 226 to generate a session key Ks2a to be produced in the distribution operation by hard disk 20. Session key generating portion 226 generates session key Ks2a (step S19).

Session key generating portion 226 provides session key Ks2a generated thereby to controller 214 via bus BS3, and controller 214 receiving session key Ks2a stores session key Ks2a and license ID (LID) accepted in step S16 in log memory 250B of secure data storage portion 250, and sets status ST1 to "waiting for reception" (step S20).

Subsequently, encryption processing portion 224 encrypts one data series formed of session key Ks2a and individual public key KPom2, which are applied by successively selecting contacts Pd and Pf of selector switch 262, with session key Ks1a applied from decryption processing portion 230 via contact Pb of selector switch 260, and thereby produces E(Ks1a, Ks2a//KPom2) (step S21). Encryption processing portion 224 provides E(Ks1a, Ks2a//KPom2) onto bus BS3. Controller 214 accepts encrypted data E(Ks1a, Ks2a//KPom2) provided onto bus BS3, and provides data LID//E(Ks1a, Ks2a//KPom2), which is one data series formed of the accepted data and license ID (LID), to terminal device 10 via ATA interface portion 212 and terminal 210 (step S22).

When terminal device 10 accepts data LID//E(Ks1a, Ks2a//KPom2) from hard disk 20 (step S23), it provides the accepted data to license providing device 40 over network 30 (step S24).

When license providing device 40 receives data LID//E(Ks1a, Ks2a//KPom2) (step S25), decryption processing portion 422 executes the processing with session key Ks1a, and accepts session key Ks2a produced by hard disk 20 and individual public key KPom2 of hard disk 20 (step S26).

Distribution control portion 412 obtains data ID (DID) and content key Kc corresponding to license ID (LID) from content database 402 (step S27), and produces license LIC=Kc/AC//DID//LID, which is one data series formed of data ID (LID) and content key Kc thus obtained as well as license ID (LID) and control information AC.

Distribution control portion 412 provides license LIC thus produced to encryption processing portion 424. Encryption processing portion 424 encrypts license LIC with individual public key KPom2 if hard disk 20 obtained by decryption processing portion 422, and thereby produces encrypted data E(KPom2, LIC) (step S28). Encryption processing portion 426 encrypts encrypted data E(KPom2, LIC) received from encryption processing portion 424 with session key Ks2a received from decryption processing portion 422 to produce encrypted data E(Ks2a, E(KPom2, LIC)) (step S29).

Referring to FIG. 9, distribution control portion 412 externally provides encrypted data E(Ks2a, E(KPom2, LIC)) via bus BS1 and communication device 450 (step S30). When terminal device 10 accepts encrypted data E(Ks2a, E(KPom2, LIC)) over network 30 (step S31), it provides the encrypted data thus accepted to hard disk 20 (step S32).

Controller 214 of hard disk 20 accepts encrypted data E(Ks2a, E(KPom2, LIC)) via terminal 210 and ATA interface portion 212 (step S33), and provides it onto bus BS3. Decryption processing portion 228 decrypts data E(Ks2a, E(KPom2, LIC)) provided onto bus BS3 with session key Ks2a provided from session key generating portion 226, and hard disk 20 accepts encrypted license E(KPom2, LIC) prepared by encrypting license LIC encrypted with individual public key KPom2 (step S34). Decryption processing portion 228 provides encrypted license E(KPom2, LIC) onto bus BS3.

According to the instruction of controller 214, decryption processing portion 216 decrypts encrypted license E(KPom2, LIC) with individual private key Kom to accept license LIC (step S35).

When controller 214 of hard disk 20 confirms the acceptance of license LIC, it notifies terminal device 10 of the acceptance via ATA interface portion 212 and terminal 210. When controller 108 of terminal device 10 accepts, via hard disk interface portion 110 and bus B S2, the notification of acceptance of license LIC by hard disk 20, controller 108 provides the logical block address, at which received license LIC is stored in secure data storage portion 250 of hard disk 20, to hard disk 20 via hard disk interface portion 110 (step S36). Controller 214 of hard disk 20 accepts the logical block address of destination of license LIC via terminal 210 and ATA interface portion 212 (step S37), and stores the accepted logical block address in log memory 250B (step S38).

Controller 214 compares license ID (LID) included in accepted license LIC with license ID (LID) accepted in step S16, and determines whether these match with each other or not (step S39). When the matching is confirmed, controller 214 determines that accepted license LIC is correct, and stores accepted license LIC at the logical block address, which is received from terminal device 10, in secure data storage portion 250 (step S40).

When controller 214 stores license LIC at the designated logical block address, it sets the flag corresponding to this logical block address of validity flag memory 250C to "valid" (step S41). Controller 214 further sets status ST1 in log memory 250B to "received" (step S42), and notifies terminal device 10 of the fact that the series of processing in the distribution session ends.

When terminal device 10 accepts the notification of the end of processing provided from hard disk 20, the distribution session in the data distribution system normally ends.

When controller 214 determines in step S39 that the mismatching of LID occurs and accepted license LIC is not correct, it provides an error notification to terminal device 10 (step S43), and terminal device 10 receives the error notification (step S45) so that the processing ends.

In the distribution processing illustrated in FIGS. 8 and 9, license providing device 40 records histories of the processing in a manner, which has not been described. In connection with this, as shown in FIG. 4, however, license providing device 40 is provided with log database 404, in which processing histories of various processing in the distribution session are stored. Log database 404 stores, in addition to other information, accounting information related to sending of the license.

In the series of steps for distribution processing illustrated in FIGS. 8 and 9, a failure may occur during the processing between steps S25 and S44, and thereby the processing may be interrupted. In this case, rewrite processing may be performed. For example, the interruption may occur due to various reasons such as power-off of terminal device 10 during the processing, a failure on the side of license providing device 40 or a failure in communication between terminal device 10 and license providing device 40. When the interruption of processing may occur during a period from the end of step S22, in which all the contents of the output log except for status ST2 stored in log memory 250B of hard disk 20 are stored, to step S44, hard disk 20 can be supplied with the license by performing the rewrite processing. Since the foregoing processing is configured to perform the rewrite processing according to the determination of terminal device 10, the rewrite processing is to be performed when the interruption occurred during the processing from step S25 to step S44 except for the processing in from step S22 to step S24, during which terminal device 10 can determine the progress of processing. When the interruption occurs in the steps other than the above, it is determined that license providing device 40 has not provided the license, and the processing starting from the initial step is performed in accordance with the flowcharts of FIGS. 8 and 9.

Likewise, the processing performed in license providing device 40 from step S25 to step S30, before which license providing device 40 outputs the license, is not handled as the target case of the rewrite processing if it is possible to specify the step, in which the interruption of processing occurred, and thereby is handled as the case, in which the processing starting from the initial step is to be performed in accordance with the flowcharts of FIGS. 8 and 9.

Figure 10:
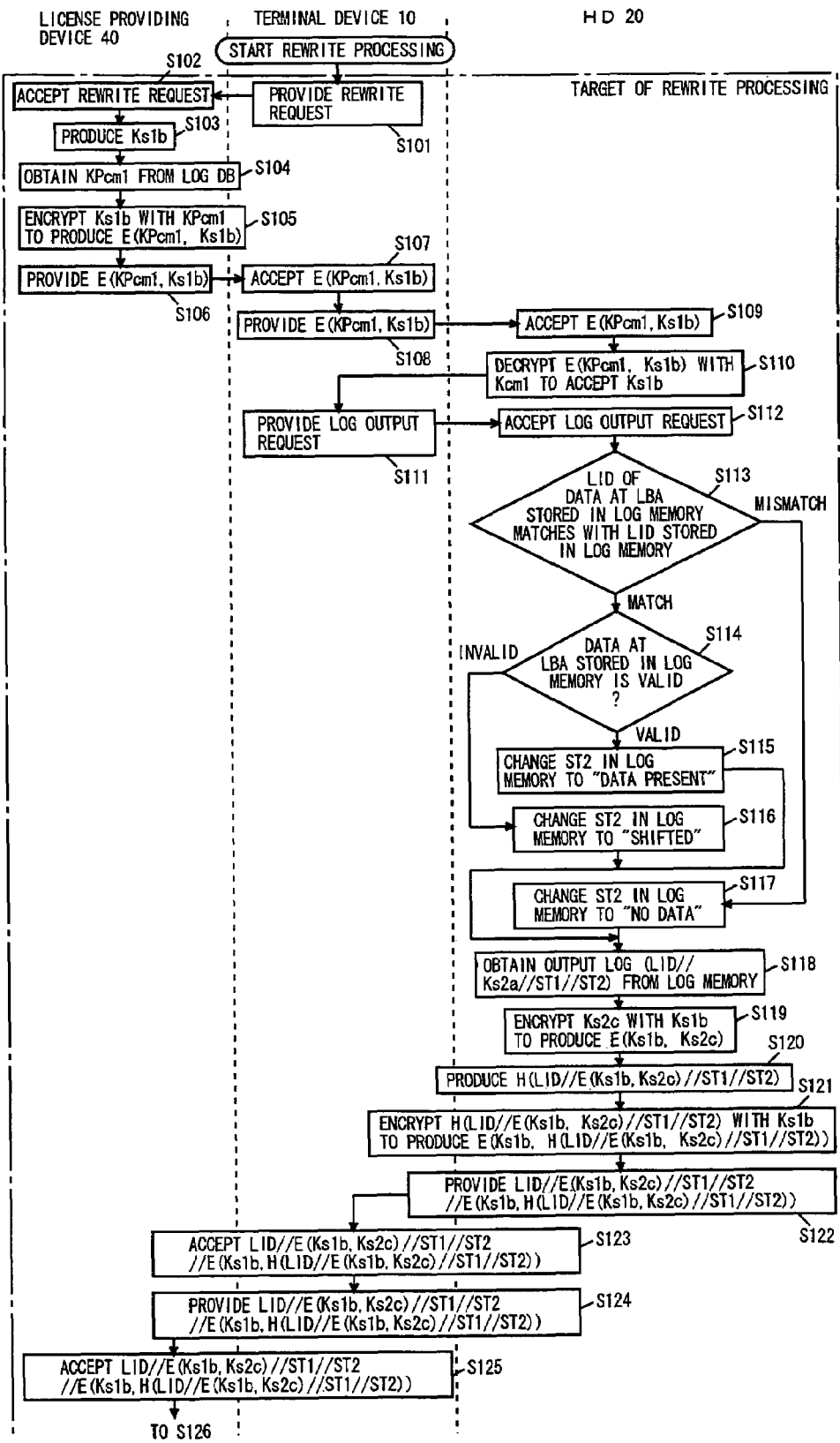
FIG. 10 is a first flowchart illustrating the rewrite processing during the distribution processing in the data distribution system shown in FIG. 1.
Figure 11:
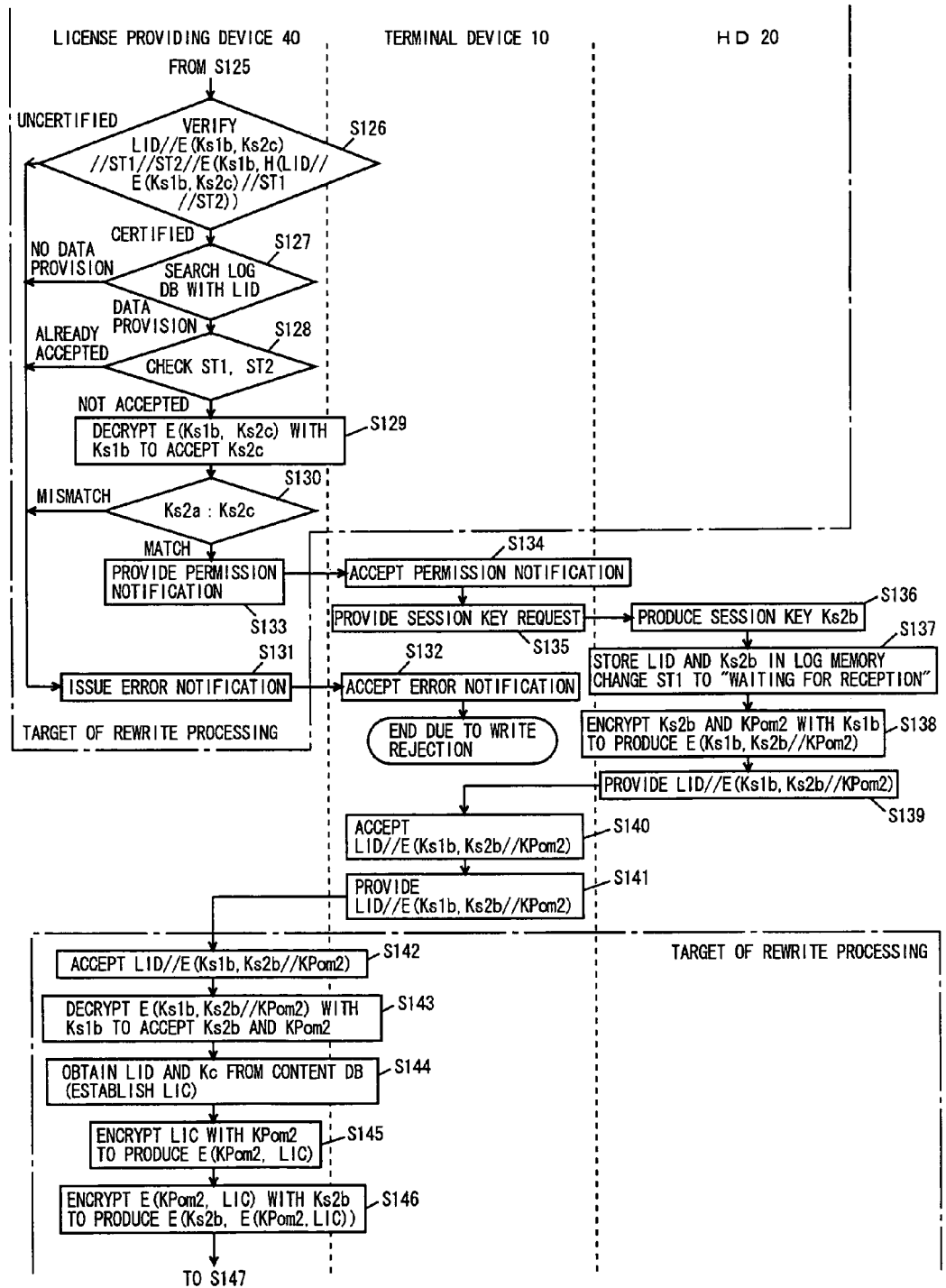
FIG. 11 is a second flowchart illustrating the rewrite processing during the distribution processing in the data distribution system shown in FIG. 1.
Figure 12:
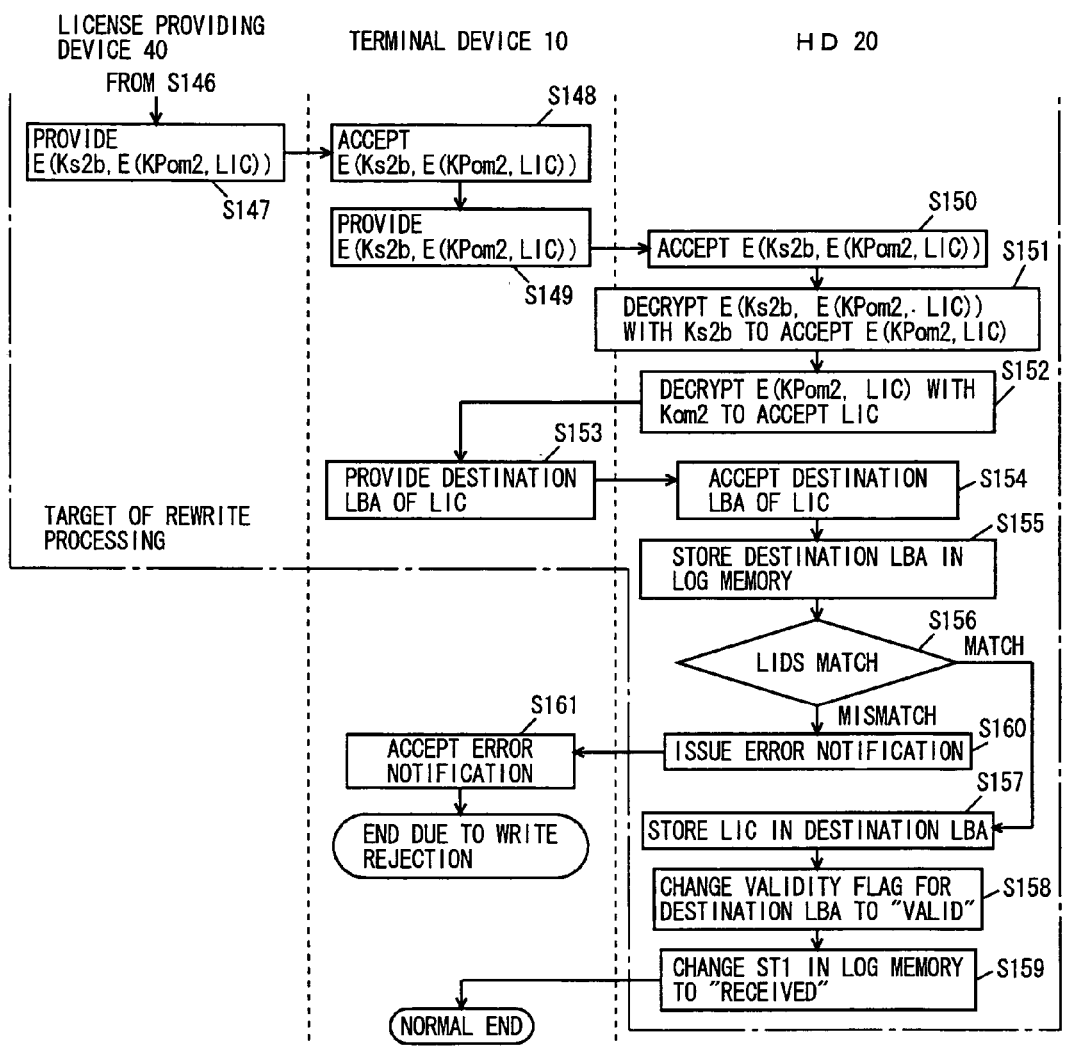
FIG. 12 is a third flowchart illustrating the rewrite processing during the distribution processing in the data distribution system shown in FIG. 1.

FIGS. 10 to 12 are first to third flowcharts illustrating the rewrite processing performed when a failure occurred during the processing from step S25 to step S44 in the distribution processing illustrated in FIGS. 8 and 9.

Referring to FIG. 10, when terminal device 10 determines that a failure occurred during the processing from step S25 to step S44, it provides a request for rewriting of license LIC to license providing device 40 over network 30 (step S101). When distribution control portion 412 accepts the rewrite request via communication device 450 and bus BS1 (step S102), it instructs session key generating portion 414 to produce the session key. Session key generating portion 414 receiving the instruction produces a session key Ks1$b$ for the rewrite processing (step S103). Distribution control portion 412 obtains class public key KPcm1 corresponding to hard disk 20 from log database 404 storing the log of transmission to and from hard disk 20 in this session (step S104), and provides it to encryption processing portion 420. Encryption processing portion 420 receiving class public key KPcm1 encrypts class public key KPcm1 with session key Ks1$b$ to produce E(KPcm1, Ks1$b$) (step S105). Distribution control portion 412 externally provides E(KPcm1, Ks1$b$) via bus BS1 and communication device 450 (step S106).

When terminal device 10 accepts E(KPcm1, Ks1$b$) over network 30 (step S107), it provides accepted E(KPcm1, Ks1$b$) to hard disk 20 (step S108). Controller 214 of hard disk 20 accepts E(KPcm1, Ks1$b$) via terminal 210 and ATA interface portion 212 (step S109). Controller 214 provides accepted E(KPcm1, Ks1$b$) to decryption processing portion 230 via bus-BS3. Decryption processing portion 230 decrypts it with class private key Kcm1, which is held by Kcm holding portion 204 and is peculiar to hard disk 20, to provide session key Ks1$b$ so that session key Ks1$b$ is accepted (step S110).

When controller 214 of hard disk 20 confirms the acceptance of session key Ks1$b$ produced by license providing device 40, it provides a notification of the acceptance to terminal device 10 via ATA interface portion 212 and terminal 210. When controller 108 of terminal device 10 accepts, via hard disk interface portion 110 and bus BS2, the notification that hard disk 20 accepted session key Ks1$b$, it provides an output request for log memory 250B stored in secure data storage portion 250 to hard disk 20 via hard disk interface portion 110 (step S111).

When controller 214 of hard disk 20 accepts the notification of output request of log memory 250B via terminal 210 and ATA interface portion 212 (step S112), it determines whether license ID (LID) of license LIC stored at the logical block address stored in log memory 250B matches with license ID (LID) stored in log memory 250B or not (step S113).

When controller 214 determines that both license IDs (LID) match with each other, the distribution processing is performed until license LIC is received from license providing device 40, and it is recognized that hard disk 20 has accepted license LIC. Thereby, controller 214 checks the flag stored in validity flag memory 250C corresponding to the license, which is stored at the address designated by the logical block address stored in log memory 250B, and determines the validity of the license (step S114).

When controller 214 determines that the license is valid, it changes status ST2 in log memory 250B to "data present", and then perform the next processing (step S118). When controller 214 determines in step S114 that the license is invalid, it changes status ST2 in log memory 250B to "shifted", and then performs the new processing in step S118.

In step S113, when controller 214 determines that compared license IDs (LID) do not match with each other, it changes status ST2 in log memory 250B to "no data" (step S117).

In this manner, the logical block address stored in log memory 250B is used, and license ID (LID) of license LIC stored at this logical block address can be directly determined based on the logical block address. Thereby, even when license memory 250A has stored a large number of licenses, it is possible to determine presence/absence of the specific license ID (LIC) without retrieving these licenses one by one.

When the processing is performed to change status ST2, controller 214 obtains license ID (LID), statuses ST1 and ST2, and a session key Ks2c from log memory 250B (step S118). In this case, session key Ks2a is stored in log memory 250B, but session key Ks2c obtained from log memory 250B is illustrated for the sake of description. Controller 214 provides session key Ks2c thus obtained to encryption processing portion 224 via bus BS3.

Encryption processing portion 224 encrypts session key Ks2c obtained from bus BS3 with session key Ks1b, which is applied from decryption processing portion 230 via contact Pb of selector switch 260, and produces E(Ks1b, Ks2c) (step S119). Encryption processing portion 224 provides E(Ks1b, Ks2c) thus produced onto bus BS3. Controller 214 accepts E(Ks1b, Ks2c) on bus BS3, produces one data series LID//E(Ks1b, Ks2c)//ST1//ST2 from E(Ks1b, Ks2c) and the data obtained in step S118, and produces hash value H(LID//E(Ks1b, Ks2c)//ST1//ST2) by using the hash function (step S120). Controller 214 provides hash value H(LID//E(Ks1b, Ks2c)H/ST1//ST2) to encryption processing portion 224 via bus BS3.

Encryption processing portion 224 encrypts hash value H(LID//E(Ks1b, Ks2c)//ST1//ST2) obtained from bus BS3 with session key Ks1b, which is applied from decryption processing portion 230 via contact Pb of selector switch 260, to produce E(Ks1b, H(LID//E(Ks1b, Ks2c)//ST1//ST2)) (step S121). Encryption processing portion 224 provides E(Ks1b, H(LID//E(Ks1b, Ks2c)//ST1//ST2)) thus produced to bus BS3. Data series LID//E(Ks1b, H(LID//E(Ks1b, Ks2c)//ST1//ST2)) will be referred to as a "receive log", and E(Ks1b, H(LID//E(Ks1b, Ks2c)//ST1//ST2) is signed data prepared by effecting electronic signing on the receive log with session key Ks1b. The purpose of encrypting session key Ks2c stored in log memory 250B with session key Ks1b is to eliminate the possibility of flow-out of the license due to leakage of session key Ks2c.

When controller 214 accepts the signature data sent from bus BS3, it produces signed receive log LID//E(Ks1b, Ks2c)//ST1//ST2//E(Ks1b, H(LID//E(Ks1b, Ks2c)l/ST1//ST2)) using the receive log obtained in step S118, and provides it to terminal device 10 via ATA interface portion 212 and terminal 210 (step S122).

When terminal device 10 accepts signed receive log LID//E(Ks1b, Ks2c)//ST1//ST2//E(Ks1b, H(LID//E(Ks1b, Ks2c)//ST1//ST2)) sent from hard disk 20 (step S123), it provides the accepted data to license providing device 40 over network 30 (step S124). License providing device 40 receives signed receive log LID//E(Ks1b, Ks2c)//ST1//ST2//E(Ks1b, H(LID//E(Ks1b, Ks2c)//ST1//ST2)) over network 30 (step S125).

Referring to FIG. 11, license providing device 40 verifies signed receive log LID//E(Ks1b, Ks2c)//ST1//ST2//E(Ks1b, H(LID//E(Ks1b, Ks2c)//ST1//ST2)) thus received (step S126). The verifying processing is performed as follows.

When distribution control portion 412 accepts the signed receive log, it provides the second half of the signed receive log, i.e., signature data E(Ks1b, H(LID//E(Ks1b, Ks2c)//ST1//ST2) to decryption processing portion 422. Decryption processing portion 422 decrypts signature data E(Ks1b, H(LID//E(Ks1b, Ks2c)//ST1//ST2) with session key Ks1b produced in step S103. Distribution control portion 412 calculates the hash value of the first half of the signed receive log, i.e., receive log LID//E(Ks1b, Ks2c)//ST1//ST2, and compares it with the value of H(LID//E(Ks1b, Ks2c)//ST1//ST2) decrypted by decryption processing portion 422. When distribution control portion 412 determines from a result of the decryption by decryption processing portion 422 that the decryption could be performed and the values matched, license providing device 40 certifies that the data series received from hard disk 20 includes the correct data.

When the signed receive log received from hard disk 20 is certified in step S126, distribution control portion 412 searches log database 404 based on accepted license ID (LID) (step S127). When distribution control portion 412 determines that accepted license ID (LID) is stored in log database 404, and is surely the license provided to hard disk 20, it checks the contents of accepted statuses ST1 and ST2 (step S128).

When status ST1 is "waiting for reception", and status ST2 is "no data", distribution control portion 412 determines that hard disk 20 has not accepted license LIC, which was to be sent to hard disk 20, due to a certain failure. Thereby, distribution control portion 412 provides encrypted data E(Ks1b, Ks2c) included in the received data series to decryption processing portion 422, and decryption processing portion 422 decrypts it with session key Ks1b to accept session key Ks2c. Decrypted session key Ks2c is provided to distribution control portion 412 via bus BS1, and is accepted by distribution control portion 412 (step S129)

Distribution control portion 412 compares session key Ks2a, which was being handled when the failure occurred, with the currently accepted session key Ks2c (step S130). When distribution control portion 412 determines that session key Ks2a matches with session key Ks2c, it provides a permission notification for rewriting of license LIC to terminal device 10 (step S133).

In contrast to the above, the data series received from hard disk 20 may not be certified in step S126. Also, in step S127, license ID (LID) received from hard disk 20 may not be stored in log database 404, and thus cannot be determined as the ID of the license provided to hard disk 20. In step S128, it may be determined that license LIC is accepted in hard disk 20. In step S130, it may be determined that session keys Ks2a and Ks2c do not match with each other. In these cases, distribution control portion 412 issues an error notification via bus BS1 and communication device 450 (step S131). When terminal device 10 accepts the error notification over network 30 (step S132), the processing ends. Thus, license providing device 40 rejects the rewriting of the license, and the processing ends.

When controller 108 of terminal device 10 accepts the permission notification, which is issued in step S133 by license providing device 40, in a step S134, it issues a request notification for production of the session key, which is to be produced in the distribution operation by hard disk 20, to hard disk 20 via bus BS2 and hard disk interface portion 110 (step S135).

When hard disk 20 accepts the request notification for production of the session key issued from terminal device 10 based on the rewrite processing permission notification provided from license providing device 40, similar processing is performed except for that session key Ks2b is newly produced and used instead of session key Ks2a in the series of processing from step S19 to the end of the processing illustrated in FIGS. 8 and 9. Therefore, a series of processing following step S13 5 will not be described.

When the interruption occurs in the rewrite processing during the distribution of the license illustrated in the flowcharts of FIGS. 10 to 12, processing is performed as follows. When the interruption occurs in any one of steps S101-S131, S133 and S142-S160, the rewrite processing can be performed in accordance with the flowcharts of FIGS. 10 to 12. When interruption occurs in any one of steps S134-S141, the license distribution processing illustrated in the flowcharts of FIGS. 8 and 9 is restarted from the initial step so that the processing can be resumed.

As described above, it is confirmed that hard disk 20 attached to terminal device 10 holds correct class certificate Cm1. After this confirmation, the encryption keys (session keys), which are produced by license providing device 40 and hard disk 20, respectively, are mutually transmitted with class public key KPcm1, which is sent together with class certificate Cm1 including it. Each side executes the encryption with the received encryption key, and sends the encrypted data to the opposite side so that mutual certification can be practically performed in the processing of transmitting the encrypted data between the opposite sides. Thereby, it is possible to prohibit the unauthorized distribution of the license to the hard disk, and the security of the data distribution system can be improved.

Further, even when the license distribution processing is interrupted, the receive log on hard disk 20, which is the data storage device on the receiver side, is sent to license providing device 40 so that the resending of the license can be performed safely without performing double distribution of the license.

When the logical block address for storing the license on hard disk 20 is instructed, the logical block address is stored as a part of the log. Thereby, when a failure occurs during the distribution session, the state of storage of license LIC, which is to be recorded during the same session, in license memory 250A can be directly checked according to the logical block address stored in log memory 250B without searching data in license memory 250A capable of storing a large number of license, and the receive log can be produced rapidly. Accordingly, the rewrite processing can be performed rapidly in the distribution processing.

In the above description, the signed receive log is LID//E(Ks1b, Ks2c)//HST1//ST2//E(Ks1b, H(LID//E(Ks1b, Ks2c)//ST1//ST2)). For more rapid verification, the signed receive log may be LID//ST1//ST2//H(Ks1b, LID//Ks2c)//ST1//ST2)). In this case, sharing of Ks1b and Ks2c is also recognized by verifying the signed receive log. Also, two kinds of encryption processing at the time of signing and two kinds of decryption processing at the time of verifying can be eliminated so that the verifying processing can be rapid.

[Shift/Copy]

Figure 13:
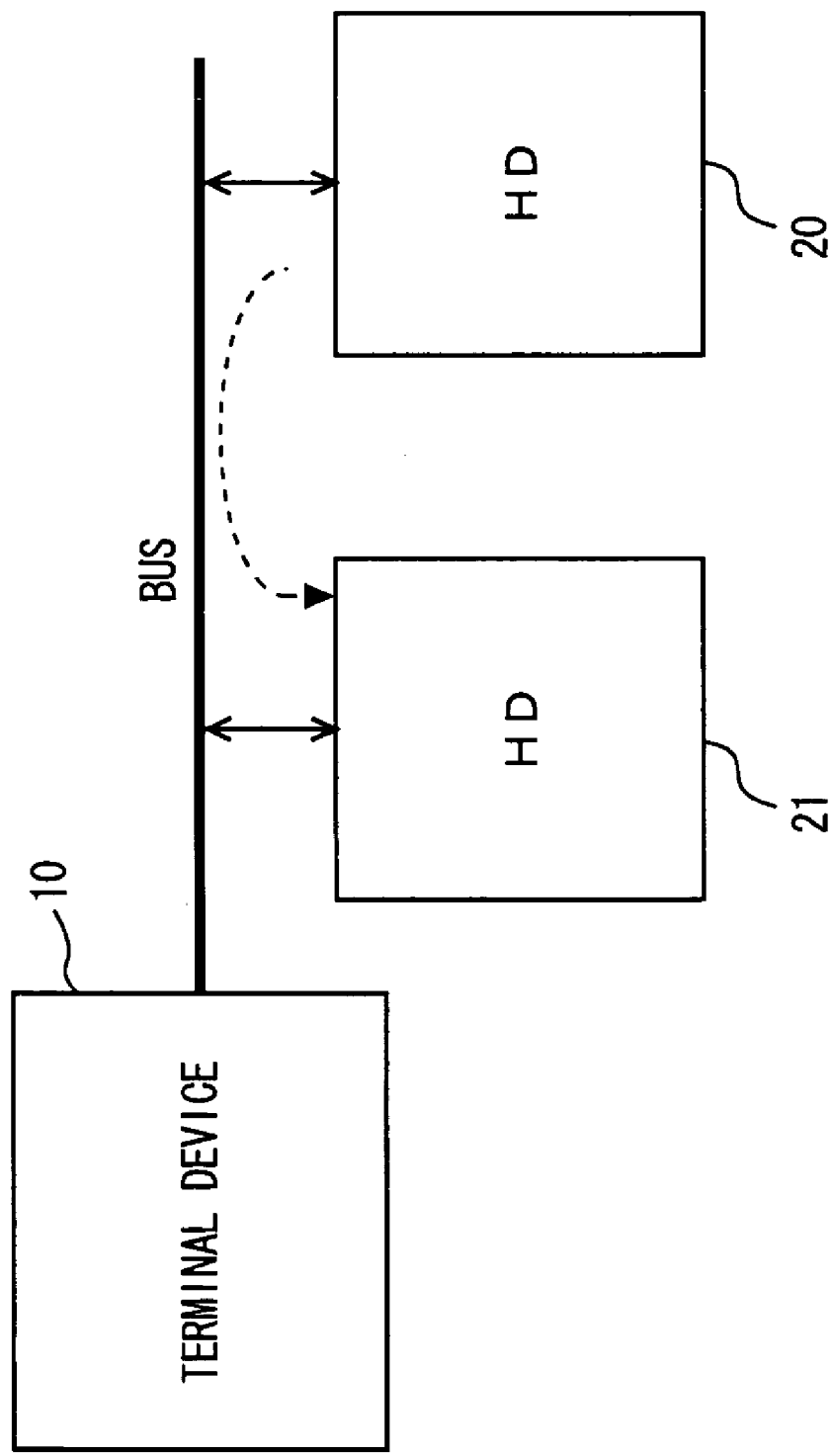
FIG. 13 is a schematic view showing a concept of a system structure performing copy/shift processing.

FIG. 13 is a schematic view showing a concept of a system structure performing copy/shift processing. Referring to FIG. 13, two data storage devices, i.e., two hard disks (HDs) 20 and 21 can be attached to terminal device 10, and it is possible to perform copying and shifting of the license from hard disk 20 to hard disk 21 via terminal device 10.

Since hard disk 21 is a data storage device different from hard disk 20, it holds individual public key KPom5 and individual private key Kom5 different from those of hard disk 20. In this case, identifier z of hard disk 21 is equal to 5 (z=5), and thus is different from z of hard disk 20 equal to 2. In the following description, the class of hard disk 21 is equal to that of hard disk 20, and thus is equal to one (y=1). Thus, each of hard disks 20 and 21 holds class certificate Cm1=KPcm1//Icm1//E(Ka, KPcm1//Icm1) and class private key Kcm1. However, if the class of hard disk 21 is different from one, i.e., the class of hard disk 20, the class certificate and the class private key are different from those of hard disk 21, similarly to the individual public key and individual private key.

Figure 14:
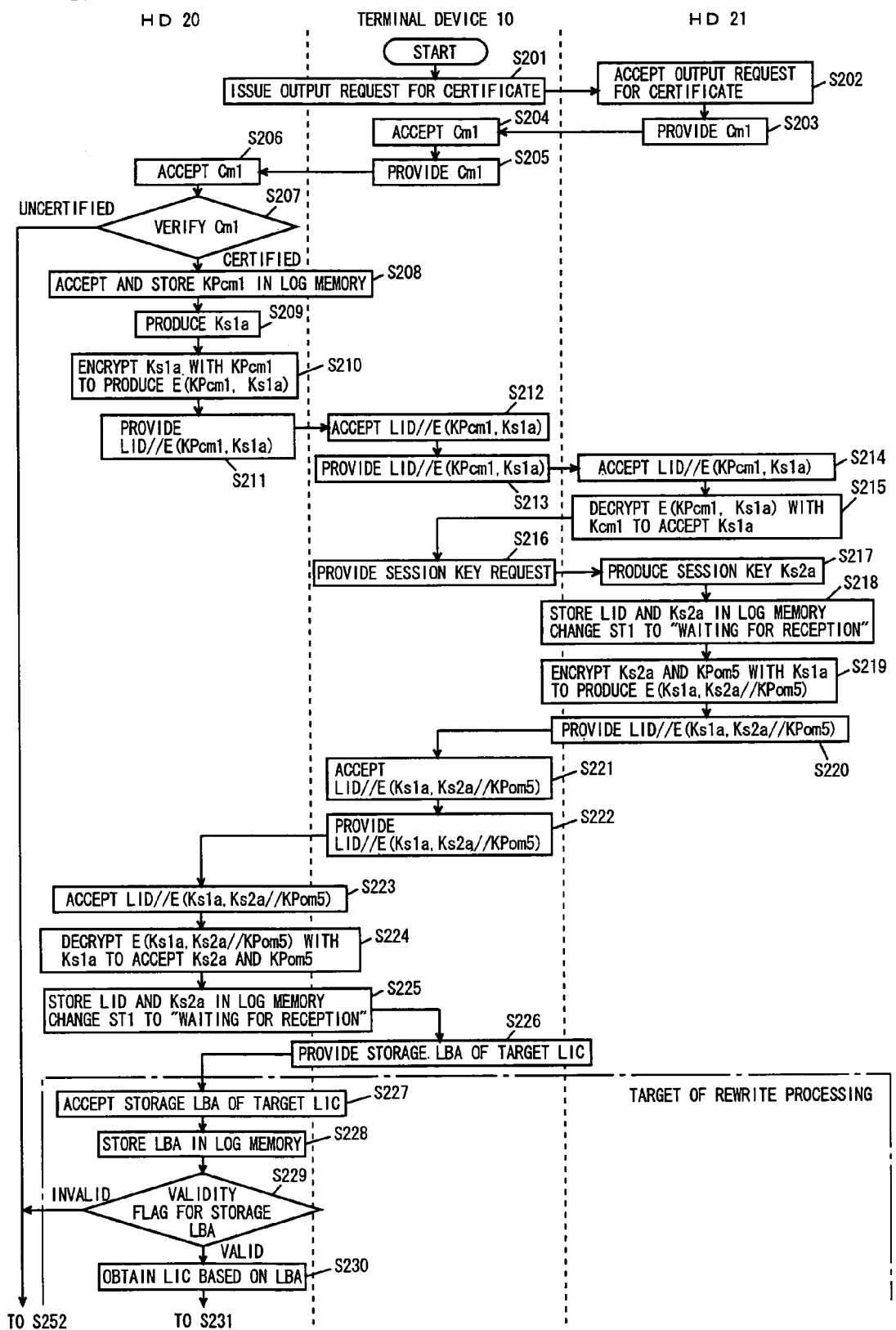
FIG. 14 is a first flowchart illustrating the copy or shift processing in the system shown in FIG. 13.
Figure 15:
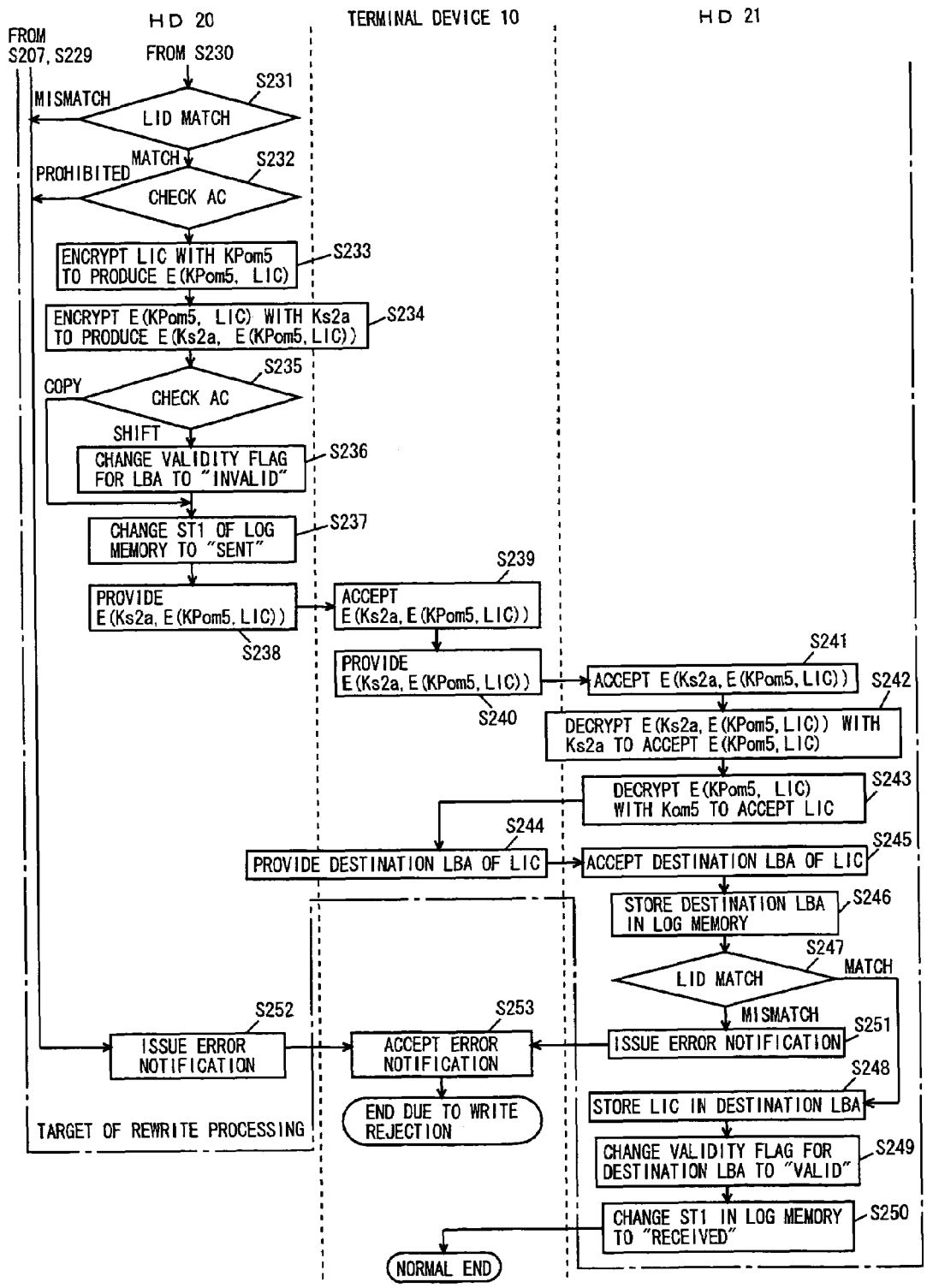
FIG. 15 is a second flowchart illustrating the copy or shift processing in the system shown in FIG. 13.

FIGS. 14 and 15 are first and second flowcharts illustrating the processing (copy/shift session) of the system allowing the copy/shift of the license shown in FIG. 13, respectively. In the illustrated processing, the user of terminal device 10 requests, from terminal device 10, the copy or shift of the license of the encrypted content data so that the license is copied or shifted from hard disk 20 attached to terminal device 10 to hard disk 21 via terminal device 10.

Referring to FIG. 14, when the user of terminal device 10 requests the copy or shift of the license for the intended content data, controller 108 of terminal device 10 issues an output request for the class certificate to hard disk 21 via bus BS2 and hard disk interface portion 110 (step S201). When controller 214 of hard disk 21 accepts the output request for the class certificate via terminal 210 and ATA interface portion 212 (step S202), it reads class certificate Cm1=KPcm1//Icm1//E(Ka, H(KPcm1//Icm1)) from certification data holding portion 202, and provides class certificate Cm1 to terminal device 10 via ATA interface portion 212 and terminal 210 (step S203).

When terminal device 10 receives class certificate Cm1 from hard disk 21 (step S204), it sends received class certificate Cm1 to hard disk 20 (step S205).

When hard disk 20 receives class certificate Cm1 of hard disk 21 from terminal device 10 (step S206), it verifies whether accepted class certificate Cm1 of hard disk 21 is the correct class certificate or not (step S207). The verifying processing is performed as follows.

When hard disk 20 accepts class certificate Cm1=KPcm1//Icm1//E(Ka, H(KPcm1//Icm1)) of hard disk 21, certifying portion 220 of hard disk 20 decrypts signature data E(Ka, H(KPcm1//Icm1)) included in class certificate Cm1 of hard disk 21 with certification key KPa. Further, certifying portion 220 calculates the hash value of KPcm1//Icm1 included in class certificate Cm1, and compares the hash value with the value of H(KPcm1//Icm1) decrypted by certifying portion 220. When controller 214 of hard disk 20 determines from the result of decryption by certifying portion 220 that the decryption could be performed and the values matched, it determines that accepted class certificate Cm1 of hard disk 21 is the correct certificate.

When it is determined in step S207 that class certificate Cm1 of hard disk 21 is the correct certificate, controller 214 of hard disk 20 approves class certificate Cm1 of hard disk 21, accepts class public key KPcm1 of hard disk 21 included in class certificate Cm1 of hard disk 21, and stores class certificate Cm1 of hard disk 21 in log memory 250B of secure data storage portion 250 of hard disk 20 (step S208). Next processing is then performed in a step S209. When it is not the correct class certificate of hard disk 21, controller 214 issues an error notification to terminal device 10 without approving and accepting class certificate Cm1 of hard disk 21 (step S252 in FIG. 15). When terminal device 10 accepts the error notification (S253 in FIG. 15), the distribution session ends.

When hard disk 20 determines from the result of verification in step S207 that hard disk 21 has the correct class certificate, class certificate Cm1 of hard disk 21 is accepted in step S208 so that session key generating portion 226 in hard disk 20 generates session key Ks1a (step S209). Encryption processing portion 222 encrypts session key Ks1a with class public key KPcm1 of hard disk 21 obtained by certifying portion 220 to produce encrypted data E(KPcm1//Ks1a) (step S210).

Controller 214 provides license ID (LID) and encrypted session key Ks1a as one data series LID//E(KPcm1, Ks1a) to terminal device 10 via ATA interface portion 212 and terminal 210 (step S211).

Controller 214 of hard disk 20 has already obtained license ID (LID) by referring to a management file in advance. The management file is a data file storing management data for managing a relationship between the encrypted content data and the licenses stored on hard disk 20, and is stored in normal data storage portion 270. The contents of the management file are renewed in response to recording or erasing of the encrypted content data as well as writing, shifting and erasing of the license.

When terminal device 10 accepts LID//E(KPcm1//Ks1a) (step S212), it provides accepted LID//E(KPcm1//Ks1a) to hard disk 21 (step S213). Controller 214 of hard disk 21 accepts LID//E(KPcm1//Ks1a) via terminal 210 and ATA interface portion 212 (step S214). Then, controller 214 provides E(KPcm1//Ks1a) to decryption processing portion 230 via bus BS3. Decryption processing portion 230 decrypts it with class private key Kcm1, which is held by Kcm holding portion 204 and is peculiar to hard disk 21, to obtain and accept session key Ks1a (step S215).

When controller 214 of hard disk 21 confirms the acceptance of session key Ks1a produced by hard disk 20, it notifies terminal device 10 of the acceptance via ATA interface portion 212 and terminal 210. When terminal device 10 accepts the notification that hard disk 21 accepted session key Ks1a, terminal device 10 issues to hard disk 21 a notification of production request for the session key to be produced by hard disk 21 in the copy/shift operation (step S216). When controller 214 of hard disk 21 accepts the notification of production request for the session key via terminal 210 and ATA interface portion 212, it instructs session key generating portion 226 to produce the session key to be produced in the license copy/shift operation. Session key generating portion 226 produces session key Ks2a (step S217).

Session key generating portion 226 provides session key Ks2a produced thereby to controller 214 via bus BS3, and controller 214 receiving session key Ks2a stores license ID (LID) accepted in step S214 and session key Ks2a in log memory 250B of secure data storage portion 250 of hard disk 21, and sets status ST1 to "waiting for reception" (step S218).

Subsequently, encryption processing portion 224 of hard disk 21 encrypts one data series formed of session key Ks2a and individual public key KPom5, which are applied by successively switching selector switch 262 between contacts Pd and Pf, with session key Ks1a applied via contact Pb of selector switch 260 from decryption processing portion 230, and thereby produces E(Ks1a, Ks2a//KPom5) (step S219). Encryption processing portion 224 provides E(Ks1a, Ks2a//KPom5) onto bus BS3. Controller 214 accepts encrypted data E(Ks1a, Ks2a//KPom5) provided onto bus BS3, and provides one series of data LID//E(Ks1a, Ks2a//KPom5), which is formed of the accepted encrypted data and license ID (LID), to terminal device 10 via ATA interface portion 212 and terminal 210 (step S220).

When terminal device 10 accepts LID//E(Ks1a, Ks2a//KPom5) from hard disk 21 (step S221), it outputs the accepted data to hard disk 20 (step S222).

When hard disk 20 accepts data LID//E(Ks1a, Ks2a//KPom5) (step S223), decryption processing portion 228 performs the decryption processing with session key Ks1a to accept session key Ks2a produced by hard disk 21 as well as individual public key KPom5 of hard disk 21 (step S224). Decryption processing portion 228 provides the decrypted session key Ks2a to controller 214 via bus BS3, and controller 214 stores license ID (LID) accepted in step S223 and session key Ks2a in log memory 250B of secure data storage portion 250 of hard disk 20, and sets status ST1 to "waiting for sending" (step S225).

When the processing in step S225 ends, controller 214 of hard disk 20 notifies terminal device 10 of the ending via ATA interface portion 212 and terminal 210. When controller 108 of terminal device 10 accepts the notification sent from hard disk 20 via hard disk interface portion I 10 and bus BS2, it provides the logical block address of secure data storage portion 250 of hard disk 20, at which license LIC to be sent from hard disk 20 to hard disk 21 is stored, to hard disk 20 via bus BS2 and hard disk interface portion 110 (step S226). When controller 214 of hard disk 20 accepts the logical block address of destination of license LIC to be sent via terminal 210 and ATA interface portion 212 (step S227), it stores the accepted logical block address in log memory 250B of secure data storage portion 250 (step S228).

Controller 214 determines whether the flag in validity flag memory 250C corresponding to license LIC stored at the accepted logical block address is "valid" or "invalid" (step S229). When the validity flag is "valid", controller 214 obtains the license LIC, which is to be stored at the accepted logical block address, in accordance with the accepted logical block address (step S230).

Referring to FIG. 15, when controller 214 obtains target license LIC, it compares license ID (LID) included in license LIC with license ID (LID) accepted in step S223, and checks whether these IDs match with each other or not (step S231). When controller 214 confirms the matching, it determines control information AC included in obtained license LIC, and checks whether a restriction is imposed on the use or not (step S232).

When controller 214 determines that control information AC does not prohibit the use of license LIC, it applies obtained license LIC to encryption processing portion 232. Encryption processing portion 232 encrypts license LIC with individual public key KPom5 of hard disk 21 obtained by decryption processing portion 228 to produce encrypted data E(KPom5, LIC) (step S233). Encryption processing portion 232 provides encrypted data E(KPom5, LIC) to encryption processing portion 224 via a selector switch Pc, and encryption processing portion 224 encrypts the encrypted data received from encryption processing portion 232 with session key Ks2a received from decryption processing portion 228 to produce encrypted data E(Ks2a, E(KPom5, LIC)) (step S234).

Based on control information AC included in target license LIC, controller 214 then determines whether the sending-of license LIC from hard disk 20 to hard disk 21 is "shift" or "copy" (step S235). When controller 214 determines that it is "shift", it sets the flag in validity flag memory 250C corresponding to target license LIC to "invalid" (step S236). When controller 214 determines that it is "copy", the current license may be left on hard disk 20 so that it starts next processing in a step S237 without changing the flag in validity flag memory 250C.

When the processing of validity flag memory 250C ends, controller 214 changes status ST1 in log memory 250B to "sent" (step S237), and sends encrypted data E(Ks2a, E(KPom5, LIC)) to terminal device 10 via ATA interface portion 212 and terminal 210 (step S238).

In some cases, i.e., when the flag in validity flag memory 250C corresponding to the logical block address accepted in step S229 is "invalid", when matching of license ID (LID) does not occur in step S231, or when control information AC included in obtained license LIC prohibits the use of obtained license LIC in step S232, controller 214 issues the error notification to terminal device 10 (step S252). When terminal device 10 accepts the error notification (step S253), the processing ends.

When terminal device 10 accepts encrypted data E(Ks2a, E(KPom5, LIC)) provided from hard disk 20 in step S238 (step S239), it provides the encrypted data thus accepted to hard disk 21 (step S240). When controller 214 of hard disk 21 accepts encrypted data E(Ks2a, E(KPom5, LIC)) via terminal 210 and ATA interface portion 212 (step S241), controller 214 provides it onto bus BS3. Decryption processing portion 228 decrypts data E(Ks2a, E(KPom5, LIC)) provided onto bus BS3 with session key Ks2a provided from session key generating portion 226, and hard disk 21 accepts encrypted license E(KPom5, LIC) prepared by encrypting license LIC with individual public key KPom5 (step S242). Decryption processing portion 228 provides encrypted license E(KPom5, LIC) onto bus BS3.

In accordance with the instruction of controller 214, encrypted license E(KPom5, LIC) is decrypted with individual private key Kom5, and hard disk 21 accepts license LIC (step S243).

When controller 214 confirms the acceptance of license LIC, it notifies terminal device 10 of the acceptance via ATA interface portion 212 and terminal 210. When controller 108 of terminal device 10 receives the notification of acceptance of license LIC by hard disk 21 via hard disk interface portion 110 and bus BS2, it provides the logical block address, at which received license LIC is to be stored in secure data storage portion 250 of hard disk 21, to hard disk 21 via hard disk interface portion 110 (step S244). When controller 214 of hard disk 21 accepts the logical block address of destination of license LIC via terminal 210 and ATA interface portion 212 (step S245), it stores the accepted logical block address in log memory 250B (step S246).

Controller 214 compares license ID (LID) included in accepted license LIC with license ID (LID) accepted in step S214, and determines whether these IDs match with each other or not (step S247). When these IDs match with each other, controller 214 determines that accepted license LIC is correct, and stores accepted license LIC at the logical block address, which is received from terminal device 10, in secure data storage portion 250 (step S248).

When controller 214 stores license LIC at the designated logical block address, it sets the flag, which corresponds to the logical block address, in validity flag memory 250C to "valid" (step S249). Controller 214 sets status ST1 in log memory 250B to "received" (step S250), and notifies, via ATA interface portion 212 and terminal 210, terminal device 10 of the fact that the series of processing in the copy/shift session ends.

When terminal device 10 accepts the processing end notification sent from hard disk 21, the session of copy/shift between hard disks 20 and 21 normally ends.

When mismatch occurs between the IDs in step S247, controller 214 determines that the accepted license LIC is not correct, and issues the error notification to terminal device 10 via ATA interface portion 212 and terminal 210 (step S251). When terminal device 10 accepts the error notification (step S253), the copy/shift session ends.

Similarly to the distribution session, rewrite processing is to be performed when interruption occurs in the series of processing of the copy/shift session illustrated in FIGS. 14 and 15 due to a failure during the processing from step S227 to step S252.

In the copy/shift session illustrated in FIGS. 14 and 15, the rewrite processing is to be performed when the interruption occurs during the processing from step S227 to step S235 for the following reasons. The series of processing from step S227 to step S235 is internal processing, and it is impossible to specify the step, in which processing of terminal device 10 failed, among the steps from step S227 to step S238. Therefore, it is assumed that step S236 was executed to invalidate the license in all the cases, and thus the rewrite processing is to be performed as described above.

For the following reasons, the rewrite processing is to be performed for the processing from step S236 to step S247. In the shift processing, the license on hard disk 20 is invalidated in step S236, and will be invalid during the above period from step S236 to step S247. Also, the valid license is not present on hard disk 21 during the above period. Therefore, if the processing is interrupted during the above period, the target license is lost. In the case of copy processing, since the license is not invalidated in step S236, the rewrite processing may be performed similarly to the case of the shift processing, or the copy processing may be restarted from the initial step. In the case of the shift processing, however, only the rewrite processing can restore the license.

The rewrite processing is performed for the processing from step S248 to step S250 for the following reasons. Steps S249 and S250 are performed after the writing of license in step S248, and thus primary processing are already completed before these steps. However, terminal device 10 cannot determine the end of step S248 so that it is assumed that step S248 has not ended, and it is configured to perform the rewrite processing for steps S248 to step S250. When the rewrite processing is performed after the end of step S248, rewriting will be rejected in the rewrite processing.

The rewrite processing is further performed for the processing in step S251 for the following reasons. The processing in step S251 is primarily interrupted only in an extremely special case, but it is impossible to determine the fact that the processing is interrupted in step S251. Therefore, the system is configured to perform the rewrite processing for step S251.

When it is determined in terminal device 10 that the session is the copy of the license as described above, or when it is possible to specify the step, in which the processing is interrupted, among steps S227-S235 and steps S249-S251, the rewrite processing is not necessarily required, and it is merely required to execute the copy/shift session illustrated in FIGS. 14 and 15 again.

Figure 16:
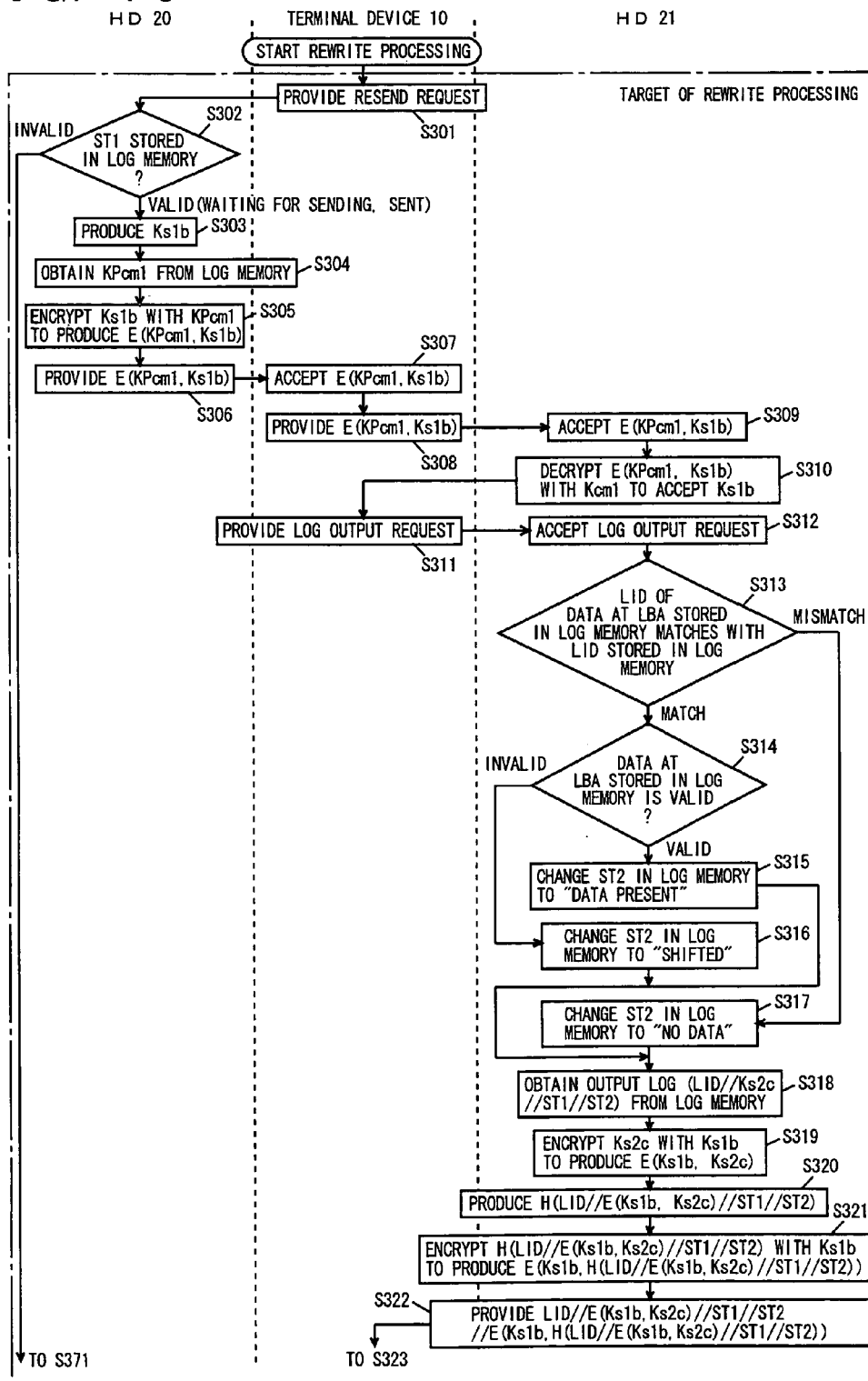
FIG. 16 is a first flowchart illustrating the rewrite processing during the copy or shift processing in the system shown in FIG. 13.
Figure 17:
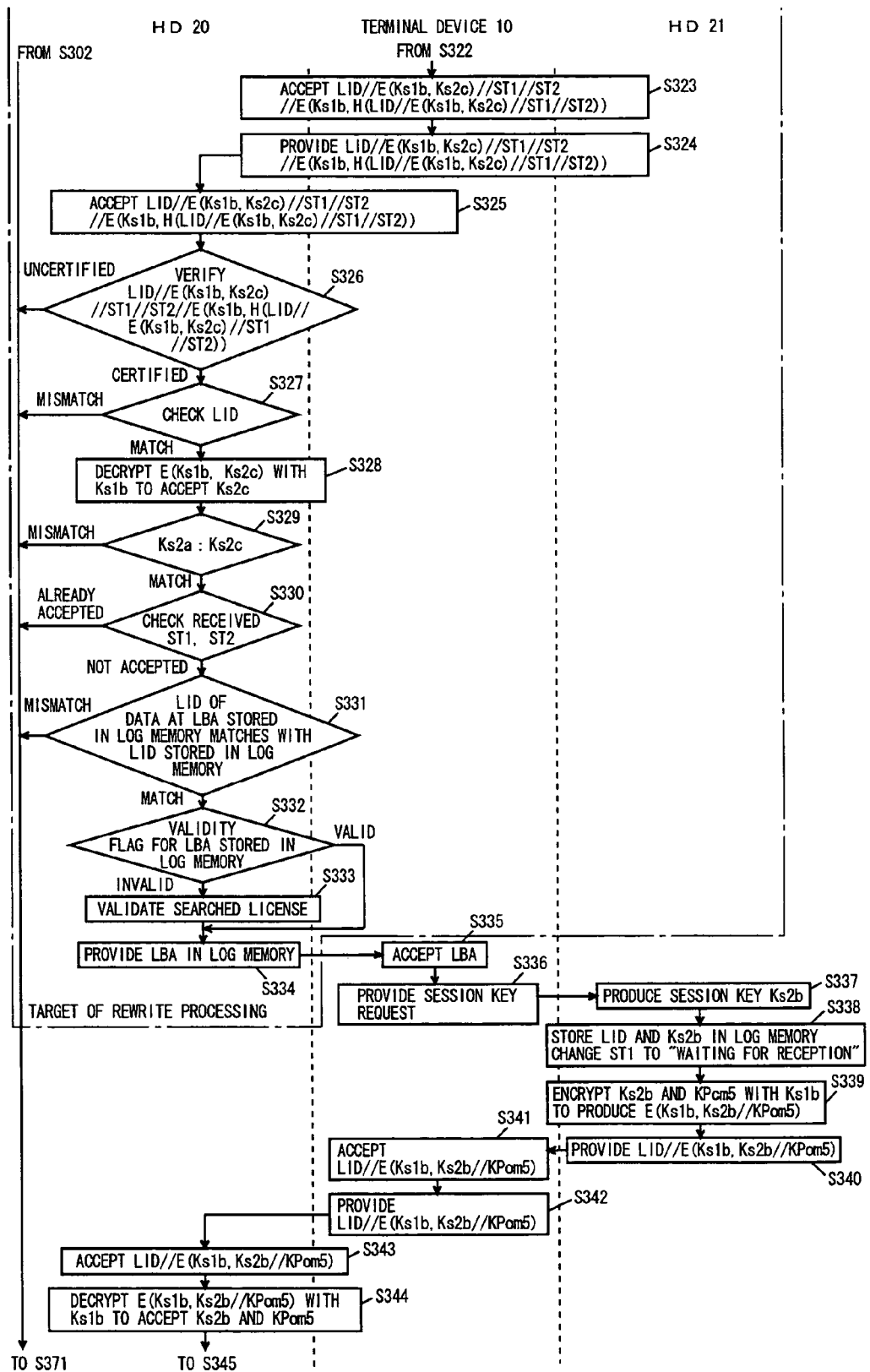
FIG. 17 is a second flowchart illustrating the rewrite processing during the copy or shift processing in the system shown in FIG. 13.
Figure 18:
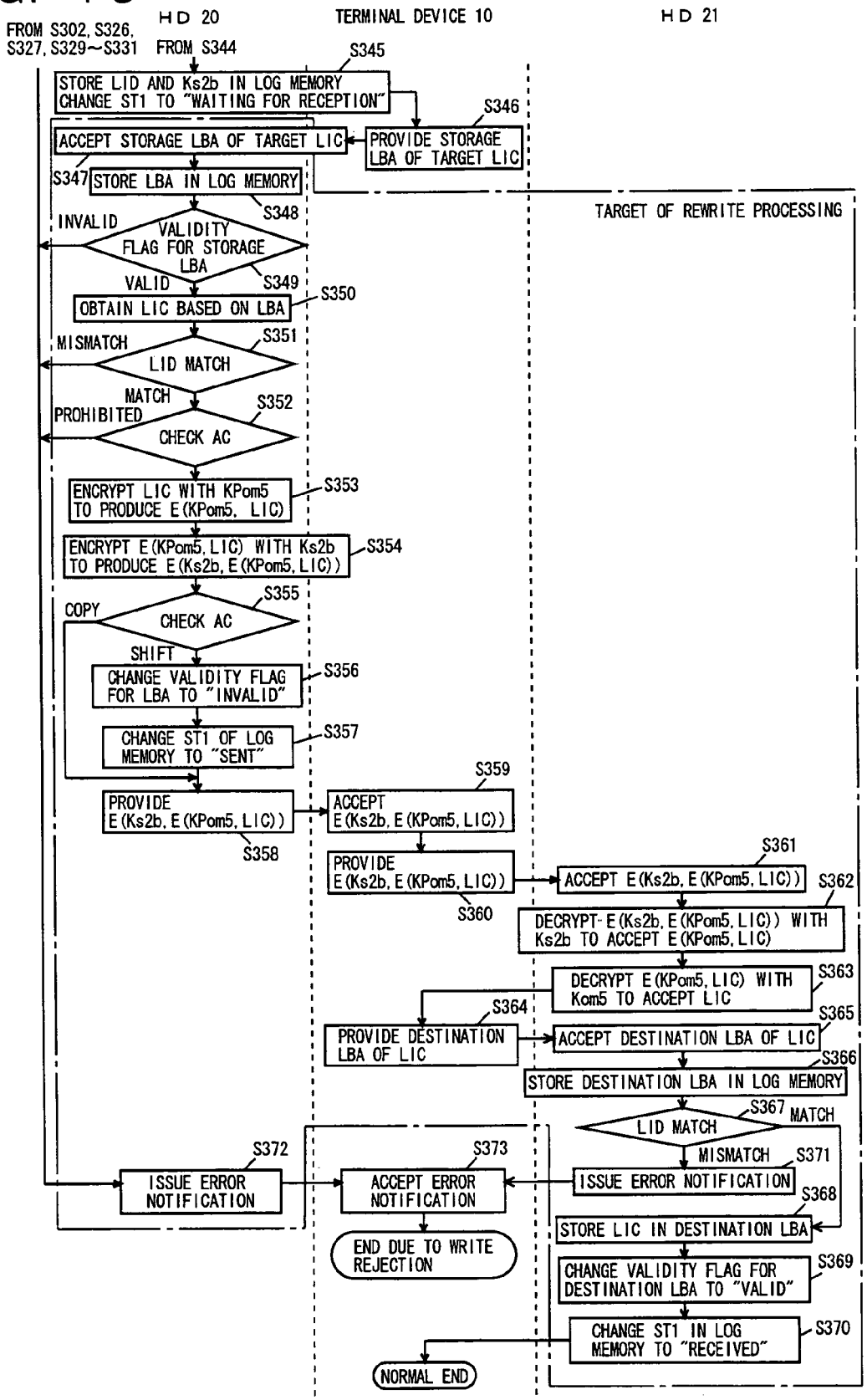
FIG. 18 is a third flowchart illustrating the rewrite processing during the copy or shift processing in the system shown in FIG. 13.

FIGS. 16 to 18 are first to third flowcharts, respectively. These flowcharts illustrate the rewrite processing performed when a failure occurred during processing from step S227 to step S252 in the processing flow of the copy/shift session illustrated in FIGS. 14 and 15.

Referring to FIG. 16, when terminal device 10 determines that a failure occurred during the processing from step S227 to step S252, it issues a request for resending of license LIC to hard disk 20 (step S301). When controller 214 of hard disk 20 accepts the resending request via terminal 210 and ATA interface portion 212, it determines the state of status ST1 stored in log memory 250B of secure data storage portion 250 (step S302). When controller 214 determines that status ST1 is neither "waiting for sending" nor "sent", i.e., when it is not on the sender side of license LIC in the copy/shift session, the processing moves to a step S371 in FIG. 18.

When status ST1 is "waiting for sending" or "sent", controller 214 of hard disk 20 instructs session key generating portion 226 to produce a session key, and session key generating portion 226 produces session key Ks1*b* (step S303). When session key Ks1*b* is produced, controller 214 obtains class public key KPcm1 of hard disk 21, which was accepted before the interruption and has been stored in log memory 250B, in a step S304. Encryption processing portion 222 encrypts session key Ks1*b* with class public key KPcm1 of hard disk 21 to produce encrypted data E(KPcm1, Ks1*b*) (step S305). Controller 214 provides encrypted data E(KPcm1, Ks1*b*) thus produced to terminal device 10 via ATA interface portion 212 and terminal 210 (step S306).

Terminal device 10 accepts encrypted data E(KPcm1, Ks1*b*) (step S307), and provides it to hard disk 21. Controller 214 of hard disk 21 accepts encrypted data E(KPcm1, Ks1*b*) via terminal 210 and ATA interface portion 212 (step S309), and provides it to decryption processing portion 230 via bus BS3. Decryption processing portion 230 performs the decryption with class private key Kcm1, which is peculiar to hard disk 21 and is held by Kcm holding portion 204, to obtain and accept session key Ks1*b* (step S310).

When controller 214 of hard disk 21 confirms the acceptance of session key Ks1*b* produced by hard disk 20, it notifies terminal device 10 of the acceptance via ATA interface portion 212 and terminal 210. When controller 108 of terminal device 10 accepts the notification sent from hard disk 21 via hard disk interface portion 110 and bus BS2, it issues a request, which requesting output of the log stored in log memory 250B of hard disk 21 to hard disk 20, to hard disk 21 via bus BS2 and hard disk interface portion 110 (step S311). When controller 214 of hard disk 21 accepts the output request for the log via terminal 210 and ATA interface portion 212 (step S312), it determines whether license ID (LID) of license LIC stored at the logical block address, which is stored in log memory 250B, matches with license ID (LID) stored in log memory 250B or not (step S313).

When these license IDs (LID) match with each other, controller 214 further checks the flag in validity flag memory 250C corresponding to license LIC, which is stored at the logical block address stored in log memory 250B, and determines whether license LIC is valid or invalid (step S314). When the flag in validity flag memory 250C is "valid", controller 214 changes status ST2 in log memory 250B,-to "data present" (step S315), and next processing starts in a step S318. When the flag in validity flag memory 250C is "invalid", controller 214 changes status ST2 in log memory 250B to "sent" (step S316), and next processing starts in step S318.

When the license IDs (LID) do not match in step S313, controller 214 changes status ST2 in log memory 250B to "no data" (step S317).

In the copy/shift session, as described above, the logical block address stored in log memory 250B is likewise used, and license ID (LID) of the license stored in the storage position of license memory 250A designated by the logical block address can be directly confirmed base on the logical block address. Therefore, even when license memory 250A has stored a large number of licenses, license ID (LID) can be specified or the presence/absence thereof can be determined without retrieving these licenses one by one.

When status ST2 changes, controller 214 obtains license ID (LID), statuses ST1 and ST2, and session key Ks2*c* from log memory 250B (step S318). In this case, session key Ks2*a* is stored in log memory 250B, but session key Ks2*c* obtained from log memory 250B is illustrated for the sake of description. Controller 214 provides session key Ks2*c* thus obtained to encryption processing portion 224 via bus BS3.

Encryption processing portion 224 encrypts session key Ks2*c* with session key Ks1*b*, which is applied from decryption processing portion 230 via contact Pb of selector switch 260, and produces E(Ks1*b*, Ks2*c*) (step S319). Encryption processing portion 224 provides E(Ks1*b*, Ks2*c*) thus produced onto bus BS3. Controller 214 accepts E(Ks1*b*, Ks2*c*) on bus BS3, produces one receive log LID//E(Ks1*b*, Ks2*c*)//ST1//ST2 from E(Ks1*b*, Ks2*c*) and the data obtained in step S318, and produces hash value H(LID//E(Ks1*b*, Ks2*c*)//ST1//ST2) (step S320). Controller 214 provides hash value H(LID//E(Ks1*b*, Ks2*c*)//ST1//ST2) to encryption processing portion 224 via bus BS3.

Encryption processing portion 224 encrypts hash value H(LID//E(Ks1*b*, Ks2*c*)//ST1//ST2) obtained from bus BS3 with session key Ks1*b*, which is applied from decryption processing portion 230 via contact Pb of selector switch 260, to produce signature data E(Ks1*b*, H(LID//E(Ks1*b*, Ks2*c*)//ST1//ST2)) (step S321). Encryption processing portion 224 provides E(Ks1*b*, H(LID//E(Ks1*b*, Ks2*c*)H/ST1//ST2)) thus produced to bus BS3.

When controller 214 obtains the signature data from bus BS3, it produces signed receive log LID//E(Ks1*b*, Ks2*c*)//ST1//ST2//E(Ks1*b*, H(LID//E(Ks1*b*, Ks2*c*)//ST1//ST2)) using the receive log obtained in step S318, and provides it to terminal device 10 via ATA interface portion 212 and terminal 210 (step S322).

When terminal device 10 accepts signed receive log LID//E(Ks1*b*, Ks2*c*)H/ST1//ST2//E(Ks1*b*, H(LID//E(Ks1*b*, Ks2*c*)H/ST1//ST2)) from hard disk 21 (step S323), it provides the accepted data to hard disk 20 (step S324).

When hard disk 20 accepts signed receive log LID//E(Ks1*b*, Ks2*c*)//ST1//ST2//E(Ks1*b*, H(LID//E(Ks1*b*, Ks2*c*)//ST1//ST2)) (step S325), it verifies the accepted data (step S326). The verifying operation is performed as follows.

When controller 214 of hard disk 20 accepts the signed receive log, it provides the second half of the signed receive log, i.e., signature data E(Ks1*b*, H(LID//E(Ks1*b*, Ks2*c*)//ST1//ST2) to decryption processing portion 228. Decryption processing portion 228 decrypts signature data E(Ks1*b*, H(LID//E(Ks1*b*, Ks2*c*)//ST1//ST2) with session key Ks1*b* produced in step S303. Controller 214 of hard disk 20 calculates the hash value of the first half of the signed receive log, i.e., receive log LID//E(Ks1*b*, Ks2*c*)//ST1//ST2, and compares it with the value of H(LID//E(Ks1*b*, Ks2*c*)//ST1//ST2) decrypted by decryption processing portion 228. When controller 214 of hard disk 20 determines from a result of the decryption by decryption processing portion 228 that the decryption could be performed and the values matched, controller 214 of hard disk 20 certifies that the data series received from hard disk 21 includes the correct data.

When the signed receive log is verified in step S326, and the data thereof is certified in hard disk 20, controller 214 of hard disk 20 compares license ID (LID) included in the data accepted in step S325 with license ID (LID) stored in log memory 250B (step S327).

When these license IDs (LID) match with each other, controller 214 provides encrypted data E(Ks1*b*, Ks2*c*) included in the received data series to decryption processing portion 228, and decryption processing portion 228 decrypts it with session key Ks1*b* to accept session key Ks2*c* (step S328). Session key Ks2*c* obtained by the decryption is provided to controller 214 via bus BS3. Then, controller 214 compares session key Ks2*a*, which was being used when a failure occurred, with currently accepted session key Ks2*c*, and checks it (step S329). When controller 214 determines that matching occurs between session keys Ks2a and Ks2c, it checks the contents of accepted statuses ST1 and ST2 (step S330).

When received status ST1 is "waiting for reception" and status ST2 is "no data", controller 214 of hard disk 20 determines that license LIC, which was to be sent to hard disk 21, is not accepted by hard disk 21 due to a certain failure. Thereby, controller 214 of hard disk 20 further determines whether license ID (LID) of license LIC, which is stored at the logical block address stored in log memory 250B, matches with license ID (LID) stored in log memory 250B or not (step S331). When these license IDs (LID) match with each other, controller 214 of hard disk 20 checks the flag in validity flag memory 250C corresponding to the logical block address stored in log memory 250B, and determines whether the license LIC is valid or not (step S332). When the flag in validity flag memory 250C is "invalid", controller 214 changes the flag in validity flag memory 250C to "valid" (step S333). When the flag in validity flag memory 250C is "valid", controller 214 starts next processing in a step S334. Controller 214 obtains the logical block address stored in log memory 250B, and provides it to terminal device 10 via ATA interface portion 212 and terminal 210 (step S334).

When controller 108 of terminal device 10 receives the logical block address, at which target license LIC is to be stored, from hard disk 20 via hard disk interface portion 110 and bus BS2 (step S335), controller 108 issues a request notification for production of the session key, which is to be produced on hard disk 21 during the copy/shift operation, to hard disk 21 via bus BS2 and hard disk interface portion 110 (step S336).

When hard disk 21 accepts the production request notification for the session key from terminal device 10, processing is performed similarly to the series of processing from step S217 to the end illustrated in FIGS. 14 and 15 except for that session key Ks2b is newly produced and used in stead of session key Ks2a. Therefore, the series of processing following step S336 will not be described.

However, the processing may be ended after step S335 to leave the license on hard disk 20. In this case, the license can be shifted again in accordance with the flowcharts of FIGS. 14 and 15.

In connection with the interruption of the rewrite processing during the shifting or writing of the license according to the flowcharts of FIGS. 16-18, when the processing is interrupted in any one of steps S301-S344 and steps S347-S371, the rewrite processing can be performed in accordance with the flowcharts of FIGS. 16-18 again. When the processing is interrupted in any one of steps S324-S346, the processing for shifting or copying the license may be performed by starting it from its initial step according to the flowcharts of FIGS. 14 and 15, and thereby the processing can be resumed.

In this manner, in connection with the copying of shifting of the license between the plurality of hard disks attached to terminal device 10, processing is performed by determining that class certificate Cm1 received from hard disk 21, i.e., the destination of shifting or copying is valid, and the encryption keys (session keys) are produced by and are transmitted between the respective hard disks, between which the copying or shifting of the licenses are performed with class public key KPcm1 sent together with class certificate Cm1 including it. Each hard disk performs the encryption with the encryption key thus received, and sends the encrypted data to the opposite side. Thereby, it is possible to prohibit the unauthorized copying and shifting of the license to the hard disk. Further, the mutual certification can be practically performed in the processing of transmitting the encrypted data. Thereby, it is possible to protect the license from spoofing of the destination, and the security of the system can be improved.

Further, when the interruption occurs in the copy/shift session for the license, processing is performed similarly to that in the distribution session, and thus is performed as follows. The receive log for license LIC, which is to be handled by the copy/shift session in hard disk 21, i.e., the data storage device on the receiver side, is sent to hard disk 20, i.e., the data storage device on the sender side, and the processing is performed in hard disk 20 to compare the contents stored in log memory 250B of hard disk 20 with license LIC, which is stored in license memory 250A and is specified by the logical block address stored in log memory 250B. Further, the flag stored in validity flag memory 250C is referred to. Thereby, in the case where the interrupted copy/shift session is the processing of shifting the license, the rewrite processing can be performed safely without allowing double existence of licenses, which can be used in the two data storage devices, i.e., hard disks 20 and 21.

In addition to the above, when the logical block address for storing the license is designated in hard disk 21, i.e., the data storage device on the receiver side, this logical block address is recorded as a part of the log. Thereby, in the case of occurrence of a failure during the copy/shift session, the state of storage of license LIC, which is to be stored in this session in license memory 250A, can be directly checked without searching data in license memory 250A capable of storing a large number of licenses. This allows rapid production of the receive log. Accordingly, the rewrite processing can be performed rapidly in the copy/shift processing, similarly to the processing already described. Further, in hard disk 20, i.e., the data storage device on the sender side, it is possible to determine directly the contents and the state (permission/prohibition of use) of license LIC, which is a target of the processing.

As described above, the invention provides the data storage device and the processing manners or procedures, which can perform rapid processing while avoiding the loss of license LIC due to the interruption of the copy/shift session, and also provides the data storage device and the processing manners or procedures, which can achieve safe processing and reliable copyright protection even when the rewrite processing is to be performed.

Processing steps S202, S203, S214, S215, S217-S220, S241-S243, S245-S251, S309, S310, S312-S322, S337-S340, S361-S363 and S365-S371 of hard disk 21 in FIGS. 14-18 are the same as processing steps S2, S3, S16, S17, S19-S22, S33-S35, S37-S43, S109, S110, S112-S122, S136-S139, S150-S152 and S154-S160 of hard disk 20 in FIGS. 8-12, respectively. Thus, the processing of hard disk 21 for shifting or copying the license is the same as the processing of hard disk 20 for distributing the license. These kinds of processing are all performed in the data storage devices, i.e., hard disks 20 and 21 as the processing for writing the licenses in the data storage devices.

The signed receive log may be LID/ST1//ST2//H(Ks1b, LID//Ks2c//ST1//ST2)), similarly to the distribution processing.

[Reproduction Permission]

Referring to FIG. 5 again, hard disk 20 serving as the data storage device is attached to terminal device 10 provided with reproducing circuit 150 for reproducing the content data, and hard disk 20 gives the permission of reproduction of the content data to reproducing circuit 150 in terminal device 10.

Figure 19:
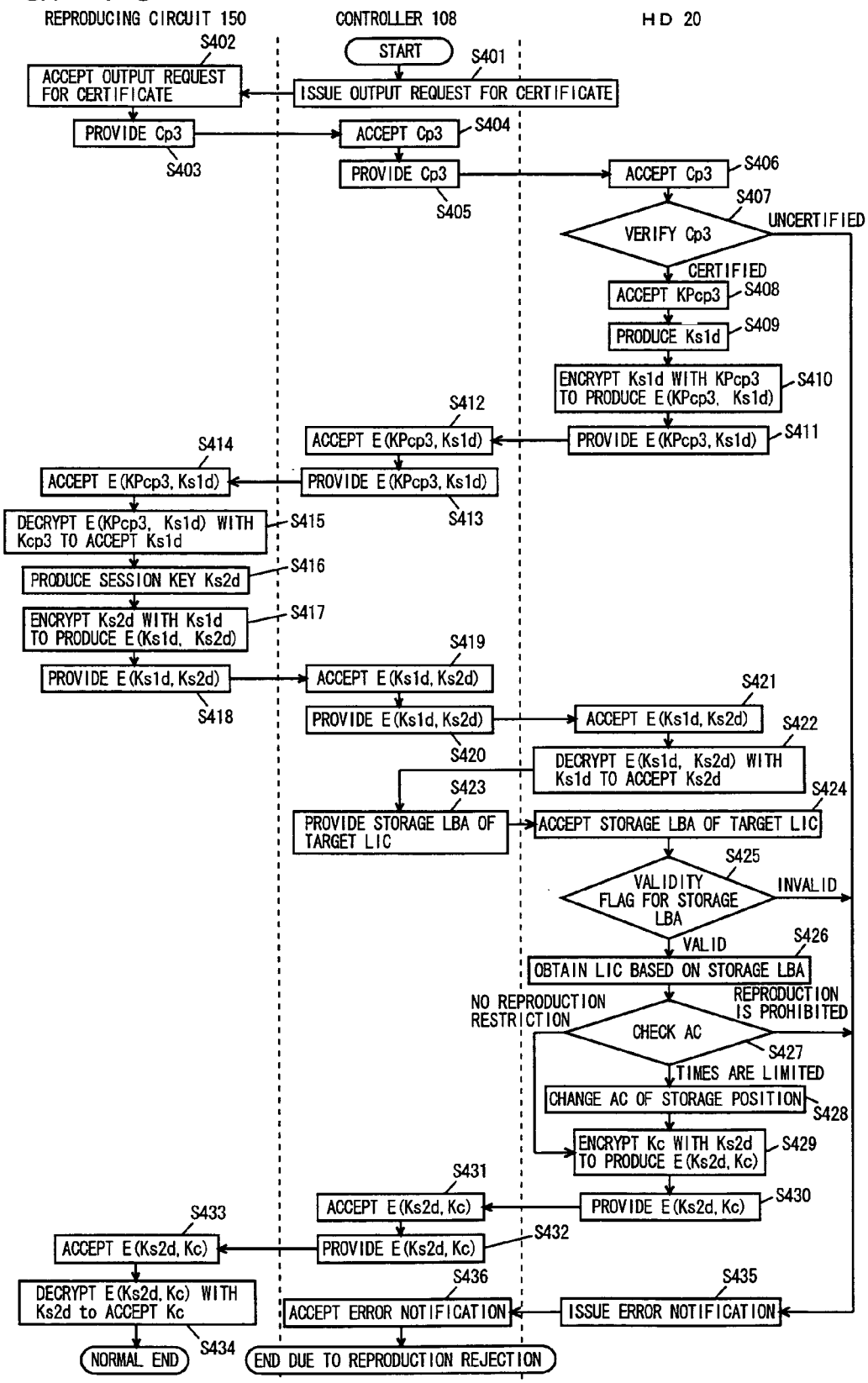
FIG. 19 is a flowchart illustrating reproduction permission processing effected on a terminal device shown in FIG. 5.

FIG. 19 is a flowchart illustrating processing (reproduction permission session), in which the user of terminal device 10 issues a reproduction request for the encrypted content data from terminal device 10, and thereby hard disk 20 attached to terminal device 10 gives the permission of reproduction to reproducing circuit 150 in terminal device 10.

Referring to FIG. 19, when the user of terminal device 10 requests the reproduction of the intended content data, controller 108 of terminal device 10 issues an output request for the class certificate to reproducing circuit 150 via bus BS2 (step S401). When certification data holding portion 1502 in reproducing circuit 150 receives the output request for the class certificate from bus BS2 (step S402), it provides class certificate Cp3=KPcp3//Icp3//E(Ka, H(KPcp3//Icp3)) held thereby onto bus BS2 (step S403).

Controller 108 accepts class certificate Cp3 sent from bus BS2 (step S404), and provides accepted class certificate Cp3 to hard disk 20 via bus BS2 and hard disk interface portion 110 (step S405).

Hard disk 20 accepts class certificate Cp3 sent from terminal device 10 (step S406), and verifies whether accepted class certificate Cp3 is correct or not (step S407). The verifying processing is performed in the same manner as that already described in connection with step S207 in the copy/shift session, and therefore description thereof is not repeated.

When it is determined in step S407 that class certificate Cp3 is correct, controller 214 approves class certificate Cp3, and accepts class public key KPcp3 included in class certificate Cp3 (step S408). Next processing is then performed in a step S409. When class certificate Cp3 is not correct, controller 214 does not approve class certificate Cp3, and issues an error notification to terminal device 10 without accepting class certificate Cp3 (step S435). When terminal device 10 accepts the error notification (step S436), the reproduction permission session ends.

When it is determined, as a result of the verification in step S407, in hard disk 20 that reproducing circuit 150 has the correct class certificate, and class public key KPcp3 is accepted in step S408, session key generating portion 226 of hard disk 20 produces session key Ks1$d$ (step S409). Encryption processing portion 222 encrypts session key Ks1$d$ with accepted class public key KPcp3 to produce encrypted data E(KPcp3, Ks1$d$) (step S410).

Controller 214 receives encrypted data E(KPcp3, Ks1$d$) from encryption processing portion 222 via bus BS3, and provides it to terminal device 10 via ATA interface portion 212 and terminal 210 (step S411).

In terminal device 10, controller 108 accepts encrypted data E(KPcp3, Ks1$d$) via hard disk interface portion 110 and bus BS2 (step S412), and controller 108 provides encrypted data E(KPcp3, Ks1$d$) thus accepted to reproducing circuit 150 via bus BS2 (step S413). Decryption processing portion 1506 of reproducing circuit 150 accepts encrypted data E(KPcp3, Ks1$d$) from bus BS2 (step S414), and performs the decryption with class private key Kcp3, which is held by Kcp holding portion 1504 and is peculiar to reproducing circuit 150, to produce-and accept session key Ks1$d$ (step S415).

When session key Ks1$d$ is accepted, session key generating portion 1508 produces a session key Ks2$d$ (step S416), and provides session key Ks2$d$ thus produced to encryption processing portion 1510. Encryption processing portion 1510 encrypts session key Ks1$d$ received from decryption processing portion 1506 with session key Ks2$d$ to produce encrypted data E(Ks1$d$, Ks2$d$) (step S417). Encryption processing portion 1510 provides encrypted data E(Ks1$d$, Ks2$d$) onto bus BS2 (step S418).

Controller 108 accepts encrypted data E(Ks1$d$, Ks2$d$) from bus BS2 (step S419), and provides the accepted data to hard disk 20 via bus BS2 and hard disk interface portion 110 (step S420).

Controller 214 of hard disk 20 accepts encrypted data E(Ks1$d$, Ks2$d$) via terminal 210 and ATA interface portion 212 (step S421), and provides the accepted data onto bus BS3. Decryption processing portion 228 decrypts encrypted data E(Ks1$d$, Ks2$d$) provided onto bus BS3 with session key Ks1$d$ applied from session key generating portion 226, and session key Ks2$d$ is accepted in hard disk 20 (step S422). When session key Ks2$d$ is accepted, controller 214 issues the notification of the acceptance to terminal device 10 via ATA interface portion 212 and terminal 210.

When controller 108 of terminal device 10 receives, via hard disk interface portion 110 and bus BS2, the notification that session key Ks2$d$ is accepted in hard disk 20, it provides the logical block address, at which license memory 250A stores target license LIC corresponding to the requested content data, to hard disk 20 via bus BS2 and hard disk interface portion 110.

When controller 214 of hard disk 20 accepts the logical block address of target license LIC via terminal 210 and ATA interface portion 212 (step S424), it determines whether the flag of validity flag memory 250C corresponding to license LIC stored in the accepted logical block address is "valid" or "invalid" (step S425).

When the flag in validity flag memory 250C is "valid", controller 214 obtains target license LIC from license memory 250A based on accepted logical block address (step S426). Controller 214 determines the contents of control information AC included in obtained license LIC (step S427). If control information AC designates the number of allowed times of use, controller 214 increments the number of allowed times of use by one, and next processing is performed in a step S429. If control information AC does not restrict the times of reproduction, controller 214 provides content key Kc included in obtained license LIC onto bus BS3.

Encryption processing portion 224 encrypts content key Kc, which is provided onto bus BS3, with session key Ks2$d$ received from decryption processing portion 228 to produce encrypted data E(Ks2$d$, Kc) (step S429), and provides the data thus produced onto bus BS3. Controller 214 provides encrypted data E(Ks2$d$, Kc) from bus BS3 to terminal device 10 via ATA interface portion 212 and terminal 210 (step S430).

Controller 108 of terminal device 10 accepts encrypted data E(Ks2$d$, Kc) via hard disk interface portion 110 and bus BS2 (step S431), and provides the accepted data onto bus BS2 (step S432).

When decryption processing portion 1512 of reproducing circuit 150 accepts encrypted data E(Ks2$d$, Kc) from bus BS2 (step S433), it decrypts encrypted data E(Ks2$d$, Kc) with session key Ks2$d$ applied from session key generating portion 1508. Thereby, reproducing circuit 150 accepts content key Kc (step S434), and the series of processing of reproduction permission session normally ends.

When the flag of validity flag memory 250C is "invalid" in a step S425, or when contents in control information AC cannot be reproduced in a step S427, controller 214 issues an error notification to terminal device 10 (step S435), and terminal device 10 accepts the error notification (step S43 6) so that the reproduction permission session ends.

As described above, in connection with the reproduction permission given from the data storage device, i.e., hard disk 20 to reproducing circuit 150 in terminal device 10, content key Kc is likewise sent to reproducing circuit 150 after confirming that reproducing circuit 150 holds correct class certificate Cp3 and that class public key KPcp3 sent together with class certificate Cp3 including it is valid. Thereby, unauthorized reproduction of the content data can be prohibited.

As described above, since the large number of licenses stored in the hard disk are managed in accordance with the logical block addresses, it is possible in the reproduction permission session to obtain directly the license corresponding to the content data requested for reproduction without retrieving it from the large number of data, and thus rapid processing can be achieved.

Although not illustrated in the flowcharts, when reproducing circuit 150 is permitted to reproduce the content, and accepts content key Kc, decryption processing portion 1514 decrypts encrypted data E(Kc, Dc) provided from hard disk 20, and reproducing portion 1516 reproduces data Dc obtained by decryption processing portion 1514 so that D/A converter 1518 perform's digital-to-analog conversion to provide reproduction signals to terminal 1520 connected to a monitor or a speaker.

All the description already given relates to the license for the content data. However, the target is not limited to the foregoing license, and may be expanded to general classified data to be handled under confidentiality. This is because the foregoing means and manners can protect the confidentiality of data, and can achieve the object of the invention relating to the specifying of the classified data in the data storage device.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

As described above, the data storage device according to the invention is useful as the data storage portion in the data distribution system requiring the copyright protection of the classified data in the digital form, and particularly is suitable to the data storage device, which must safely input/output the licenses (decryption keys and usage rules) required for reproducing the encrypted classified data prepared by encrypting the classified data, and must store the large number of licenses. Further, the data storage device according to the invention is suitable to the data storage device, which must safely input/output the classified data requiring protection, and must safely resume the input/output after interruption of the input/output of the classified data.

The invention claimed is:

1. A data storage device performing input/output of classified data in accordance with predetermined input/output procedures for protection of said classified data, and storing said classified data, comprising:
   an interface portion externally exchanging data;
   a first storage portion storing said classified data; and
   a second storage portion storing log information related to the input/output of said classified data according to said predetermined input/output procedures and an address representing a storage position of said classified data to be input/output in said first storage portion, wherein
   said log information includes:
   an identification code identifying said classified data to be input/output, and
   a first status information representing a state of storage of said classified data to be input/output in said first storage portion,
   said data storage device further comprising a control portion controlling the input/output of said classified data, wherein
   said first storage portion further stores a flag, corresponding to said classified data, indicating whether said classified data can be used or not, and
   said control portion determines the state of storage of said classified data to be input/output in said first storage portion according to comparison of an identification code of classified data stored at a storage position in said first storage portion specified by said address with an identification code stored in said second storage portion, and a state of said flag corresponding to said classified data to be input/output.

2. The data storage device according to claim 1, wherein
   said control portion operates in accordance with said predetermined input/output procedures to receive said identification code and said address of said classified data to be input/output via said interface portion, and to store said identification code and said address in said second storage portion, and operates in response to an output request of said log information externally applied via said interface portion to determine said state of storage, and to renew said first status information to the determined state of storage.

3. The data storage device according to claim 2, wherein
   said log information further includes a second status information recording a status of progression of said predetermined input/output procedures relating to the input/output of said classified data to be input/output, and
   said control portion renews said second status information in accordance with the progression of said predetermined input/output procedures.

4. The data storage device according to claim 2, wherein
   said log information further includes procedure specifying information specifying said predetermined input/output procedures, and
   said control portion renews said procedure specifying information in response to every new obtaining of said procedure specifying information.

5. The data storage device according to claim 4, further comprising:
   a cipher communication portion operating in accordance with said predetermined input/output procedures to establish a cipher communication path to a supplier or a receiver of said classified data via said interface portion, and to receive or transmit said classified data via said established cipher communication path, wherein
   in an input procedure included in said predetermined input/output procedures for receiving and storing said classified data,
   said cipher communication portion receives said classified data in accordance with said input procedure, and
   said control portion receives said address via said interface portion, stores said received address in said second storage portion, and stores said classified data received by said cipher communication portion in a storage position on said first storage portion specified by said received address.

6. The data storage device according to claim 5, wherein in said input procedure,
   said cipher communication portion produces a first session key, and
   said control portion renews said procedure specifying information with said first session key in response to every production of said first session key by said cipher communication portion.

7. The data storage device according to claim 5, further comprising:
- a signing portion producing a signed log information prepared by affixing an electronic signature to said log information or a part of said log information, wherein
- in a re-input procedure included in said predetermined input/output procedures for resuming said input procedure when said input procedure is interrupted,
- said control portion renews said first status information included in said log information stored in said second storage portion, obtains said log information from said second storage portion and applies said log information to said signing portion,
- said signing portion receives said log information including said renewed first status information to produce said signed log information, and
- said cipher communication portion transmits said signed log information produced by said signing portion via said established cipher communication path in accordance with said re-input procedure.

8. The data storage device according to claim 5, wherein
- in an output procedure included in said predetermined input/output procedures for externally outputting said classified data stored in said first storage portion,
- said control portion receives said address via said interface portion, stores said received address in said second storage portion, obtains said classified data from the storage position on said first storage portion specified by said received address, and applies said classified data to said cipher communication portion, and
- said cipher communication portion transmits said classified data received from said control portion in accordance with said output procedure.

9. The data storage device according to claim 8, wherein in said output procedure,
- said cipher communication portion receives an externally produced second session key, and
- said control portion renews said procedure specifying information with said received second session key in response to every reception of said second session key by said cipher communication portion.

10. The data storage device according to claim 8, further comprising:
- a log certifying portion verifying and certifying externally applied signed log information, wherein
- in a re-output procedure included in said predetermined input/output procedures for resuming said output procedure when said output procedure is interrupted,
- said cipher communication portion receives and applies said signed log information to said log certifying portion in accordance with said re-output procedure,
- said log certifying portion verifies said signed log information received from said cipher communication portion, and
- said control portion determines whether said output procedure is interrupted or not, based on said log information stored in said second storage portion and said received signed log information when said received signed log information is certified; determines whether the storage position on said first storage portion specified by said address stored in said second storage portion can be restored to the storage state before interruption of said output procedure or not, when it is determined that said output procedure is interrupted; restores said storage position to the storage state attained before interruption of said output procedure, and resumes said interrupted output procedure, when it is determined that the restoring is possible.

11. The data storage device according to claim 2, wherein
- said classified data includes said identification code peculiar to said classified data, and
- said control portion determines the storage state of said classified data in said first storage portion by specifying said classified data in accordance with said identification code included in said classified data stored in the storage position on said first storage portion specified by said address.

12. The data storage device according to claim 11, wherein
- in an input procedure included in said predetermined input/output procedures for receiving said classified data via said interface portion and storing said classified data in said first storage portion,
- said control portion interrupts said input procedure without storing said classified data in said first storage portion when mismatch occurs between the identification code included in said received classified data and the identification code included in said log information.

13. The data storage device according to claim 11, wherein
- in an output procedure included in said predetermined input/output procedures for outputting said classified data stored in said first storage portion via said interface portion,
- said control portion interrupts said output procedure without outputting said classified data when the identification code included in said classified data stored in the storage position on said first storage portion specified by said address does not match with the identification code included in said log information.

14. The data storage device according to claim 2, further comprising:
- a signing portion producing signed data for said log information, and producing signed log information by affixing said produced signed data to said log information, wherein
- in a re-input procedure performed for resuming an input procedure for receiving said classified data via said interface portion and storing said classified data in said first storage portion, when said input procedure is interrupted,
- said control portion outputs said signed log information produced by said signing portion via said interface portion.

15. The data storage device according to claim 14, further comprising:
- a log certifying portion verifying and certifying an additional signed log information prepared by affixing a signed data for an additional log information of said receiver to said additional log information, and received from said receiver of said classified data via said interface portion, wherein
- in a re-output procedure performed for resuming an output procedure for outputting said classified data stored in said first storage portion via said interface portion, when said output procedure is interrupted,
- said log certifying portion verifies correctness of said additional signed log information received from the receiver of said classified data in said interrupted output procedure, and
- said control portion interrupts said re-output procedure, when said additional signed log information is not certified, or when said additional signed log information is certified and it is determined based on said additional signed log information and said log information stored in said second storage portion that said output procedure is not interrupted.

16. The data storage device according to claim 1, wherein said classified data is a decryption key for decrypting and using encrypted content data, and said data storage device further comprises a third storage portion storing said encrypted content data.

* * * * *